(12) United States Patent
Pal et al.

(10) Patent No.: US 10,093,223 B2
(45) Date of Patent: Oct. 9, 2018

(54) SYSTEM AND METHOD FOR GENERATING A PARKING ALERT

(71) Applicant: SONY CORPORATION, Tokyo (JP)

(72) Inventors: Pralay Kumar Pal, Bengaluru (IN); Pramod Chintalapoodi, San Diego, CA (US); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/668,933

(22) Filed: Aug. 4, 2017

(65) Prior Publication Data

US 2017/0355301 A1 Dec. 14, 2017

Related U.S. Application Data

(63) Continuation of application No. 14/970,184, filed on Dec. 15, 2015, now Pat. No. 9,758,092.

(51) Int. Cl.
B60Q 1/48 (2006.01)
B60Q 5/00 (2006.01)

(52) U.S. Cl.
CPC .............. B60Q 1/48 (2013.01); B60Q 5/005 (2013.01)

(58) Field of Classification Search
CPC .................................. B60Q 1/48; B60Q 5/005
See application file for complete search history.

(56) References Cited

U.S. PATENT DOCUMENTS

| 5,084,697 | A | 1/1992 | Hwang |
| 5,684,474 | A | 11/1997 | Gilon et al. |
| 8,692,688 | B1 | 4/2014 | Tuxen |
| 2008/0097700 | A1 | 4/2008 | Grimm |
| 2011/0087417 | A1 | 4/2011 | Anderson et al. |
| 2012/0286974 | A1 | 11/2012 | Claussen et al. |
| 2015/0310744 | A1* | 10/2015 | Farrelly ......... G06Q 10/063114 340/932.2 |
| 2015/0348417 | A1 | 12/2015 | Ignaczak et al. |
| 2016/0321925 | A1 | 11/2016 | Al Suwaidi |
| 2017/0351267 | A1* | 12/2017 | Mielenz ............... G05D 1/0289 |

OTHER PUBLICATIONS

International Search Report in PCT Application No. PCT/JP2016/085664, dated Dec. 1, 2016, 08 pages.
Azzedine Boukerche, et al., "Vehicular Ad Hoc Networks: A New Challenge for Localization Based Systems", Computer Communications, Jul. 2008, pp. 12, Issue No. 12, Elsevier.
"Azimuthal Distance Sensor for Provision of Parking Assistance", Feb. 10, 2005, IBM.

(Continued)

Primary Examiner — Leon Flores
(74) Attorney, Agent, or Firm — Chip Law Group

(57) ABSTRACT

Various aspects of a system and method to generate a parking alert are disclosed herein. The system comprises one or more circuits controlled by an electronic control unit (ECU) in a first vehicle. The one or more circuits are configured to detect a second vehicle within a predetermined distance with respect to the first vehicle. A parking violation alert is communicated to the second vehicle and one or more users associated with the second vehicle. The communication of the parking violation alert is based on the detection of the second vehicle within the predetermined distance with respect to the first vehicle.

8 Claims, 10 Drawing Sheets

(56) References Cited

OTHER PUBLICATIONS

Notice of Allowance and Fees Due (PTOL-85) for U.S. Appl. No. 14/970,184, dated May 31, 2017, 9 pages.
Notice of Allowance and Fees Due (PTOL-85) for U.S. Appl. No. 14/970,184, dated May 18, 2017, 9 pages.
Notice of Allowance and Fees Due (PTOL-85) for U.S. Appl. No. 14/970,184, dated May 3, 2017, 9 pages.
Non-Final Rejection for U.S. Appl. No. 14/970,184, dated Dec. 6, 2016, 9 pages.

* cited by examiner

SYSTEM AND METHOD FOR GENERATING A PARKING ALERT

CROSS-REFERENCE TO RELATED APPLICATIONS/INCORPORATION BY REFERENCE

The present application is a continuation application of U.S. patent application Ser. No. 14/970,184, filed in Dec. 15, 2015, the entire content of which is hereby incorporated by reference.

FIELD

Various embodiments of the disclosure relate to a system and method to generate a parking alert. More specifically, various embodiments of the disclosure relate to a system and method to generate a parking alert based on violation of parking guidelines.

BACKGROUND

Recent advancements in the field of telematics have led to the development of in-built systems that are able to assist a driver to maneuver a vehicle to locate a parking area. For such assistance, current methods may use one or more sensors to determine a distance of a parking vehicle in the vicinity of a parked vehicle in a parking space. Such methods may further determine a distance between the parking vehicle and an obstacle.

In certain scenarios, a parking vehicle may be parked adjacent to a parked vehicle in the parking space in such a way that it obstructs a path for movement of the parked vehicle. The parking vehicle, if not appropriately parked, may obstruct the owner to access the parked vehicle. For example, the owner may not be able to open the doors of the parked vehicle due to insufficient available space. In such a scenario, it may be desirable for an owner of the parked vehicle to be notified when a path for movement of the parked vehicle and/or a path to access the parked vehicle, is obstructed. It may be further desirable that the parking vehicle is duly informed about such scenarios, so that the parking vehicles are appropriately parked in the parking area.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to generate a parking alert is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
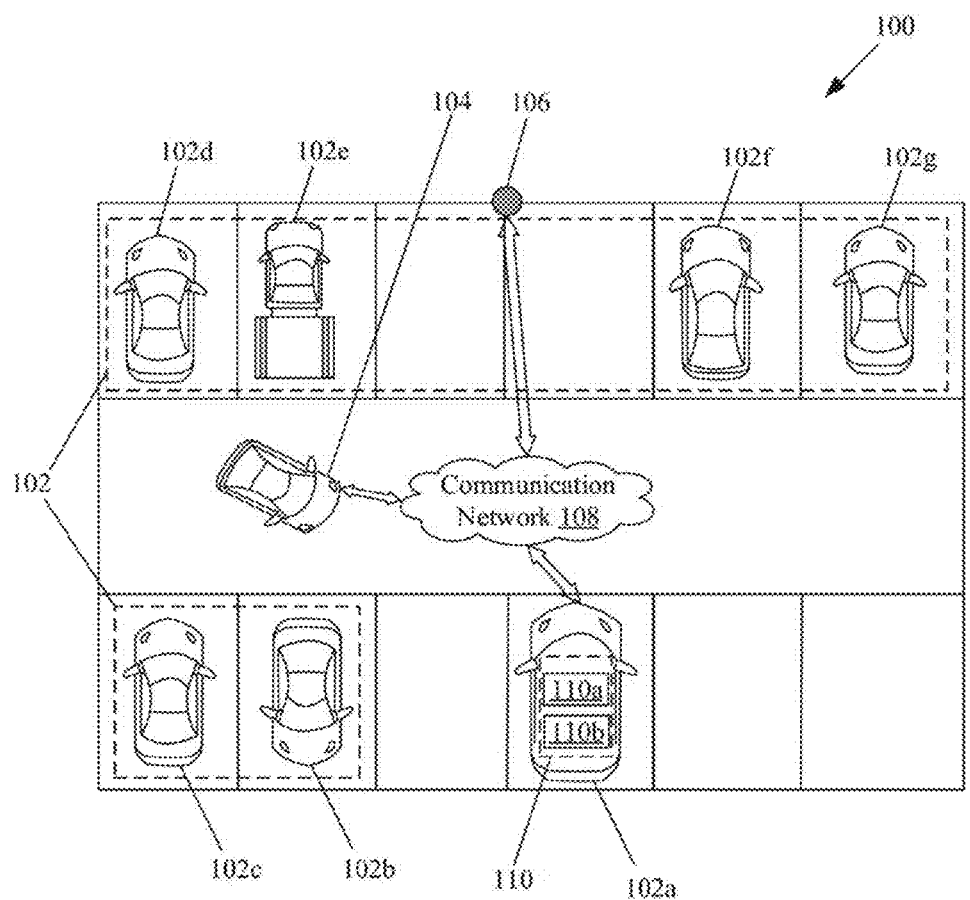
FIG. 1 is a block diagram that illustrates a parking environment, in accordance with an embodiment of the disclosure.

Various implementations may be found in a system and/or method to generate a parking alert. Exemplary aspects of the disclosure may comprise a method to generate a parking alert based on detection of a second vehicle, by one or more circuits in an electronic control unit (ECU) used in a first vehicle. The generated parking alert may be based on the detection of the second vehicle within a predetermined distance with respect to the first vehicle. The method may further comprise communication of a parking violation alert to the detected second vehicle and/or one or more users associated with the detected second vehicle.

In accordance with an embodiment, the parking violation alert may comprise one or more of an identification of the first vehicle, the predetermined distance, a notification that corresponds to a violation of a parking alert, a direction that corresponds to the predetermined distance, and/or a distance by which the predetermined distance is breached. The predetermined distance may be based on one or more of a size of the first vehicle, a direction of the first vehicle, and/or lane marking on a surface where the first vehicle is located.

In accordance with an embodiment, the communication of a parking alert, the parking violation alert, and/or a parking acknowledgement notification to the second vehicle may be based on a vehicle-to-vehicle (V2V) communication channel established between the first vehicle and the other vehicle, by use of Dedicated Short-Range Communication (DSRC).

In accordance with an embodiment, the ECU may be configured to communicate the generated parking violation alert to the second vehicle, based on remotely accessing a Digital Information Console (DIC) of the vehicle. Based on the communication of the parking violation alert, the display of the communicated parking violation alert may be enabled at the DIC. The communication of the generated parking violation alert to the second vehicle may be based on one or more of a honking by the first vehicle, a projection of a laser beam from the first vehicle, communicating alert information, and/or the blinking of indicators of the first vehicle. In accordance with an embodiment, the one or more users may correspond to one or more of an owner of the first vehicle, an authority managing a parking environment where the first vehicle may be parked, and/or an owner of the vehicle. In accordance with an embodiment, the ECU may be configured to communicate a parking acknowledgement notification to the second vehicle, when the second vehicle is parked beyond the predetermined distance with respect to the first vehicle. In accordance with an embodiment, the ECU may be configured to communicate a parking alert to the second vehicle to provide assistance to the second vehicle in parking within the predetermined distance.

Another exemplary aspect of the method to monitor a parking environment may comprise determination of parking status information, by a parking control unit, based on vehicle data received from a set of first vehicles and/or one or more captured images of the parked environment. The method may further comprise generation of a parking violation alert for the second vehicle, by the parking control unit based on the determined parking status information. The generated parking violation alert may be communicated to the second vehicle and one or more users associated with the first vehicle. The communicated parking violation alert may comprise an identifier of at least one of the set of first vehicles.

In accordance with an embodiment, the parking control unit may be configured to detect movement of the second vehicle within a predetermined distance of at least one of the set of first vehicles. The parking control unit may be configured to detect the movement of the second vehicle based on one or more of ultrasonic sensors, an imaging device, a radio detection and ranging (RADAR) unit coupled with a camera, a light detection and ranging (LIDAR) unit, installed on the parking control unit.

In accordance with an embodiment, one or more paths for movement of each of the set of first vehicles may be determined, by the parking control unit. The determination of the one or more paths may be based on the determined parking status information received from the set of first vehicles. Further, one or more maps may be updated, by the parking control unit, based on the determined parking status information received from the set of first vehicles and/or the second vehicle.

In accordance with an embodiment, the parking control unit may be configured to establish a communication channel with the set of first vehicles, based on an infrastructure-to-vehicle (I2V) network, by use of the DSRC. The determined parking status information received by the parking control unit may be based on the established communication channel.

In accordance with an embodiment, the ECU may be configured to receive from one or more of the set of first vehicles and/or the second vehicle, one or more of a Dedicated Short-Range Protocol (DSRC) identification, a latitude, a longitude, an elevation, a position accuracy, a transmission and a speed heading, a steering angle, acceleration, brake system status, a size, a direction, an identifier, and/or other optional messages.

The received parking status information may comprise one or more of an availability of a nearest parking space within the vicinity of one or more of the set of first vehicles, a size of the available nearest parking space in the vicinity of one or more of the set of first vehicles, a size of one or more of the set of first vehicles, and/or a predetermined distance with respect to the set of first vehicles. The one or more users may correspond to one or more of an owner of the second vehicle.

FIG. 1 is a block diagram that illustrates a parking environment, in accordance with an embodiment of the disclosure. With reference to FIG. 1, there is shown a parking environment 100. The parking environment 100 may comprise a set of first vehicles 102, a second vehicle 104, a parking control unit 106, and/or a communication network 108. The set of first vehicles 102 may comprise one or more first vehicles, such as 102a to 102f. Each vehicle, such as the first vehicle 102a, from the set of first vehicles 102 may include an electronic control unit (ECU) 110 and an in-vehicle network (explained in detail in FIG. 2). The ECU 110 may further comprise an imaging system 110a and a sensing system 110b. The set of first vehicles 102, the second vehicle 104, and/or the parking control unit 106 may be communicatively coupled to each other, via the communication network 108.

The set of first vehicles 102 may correspond to one or more vehicles that may be parked in a parking area of the parking environment 100. Each vehicle, such as the first vehicle 102a, in the set of first vehicles 102 may be configured to communicate with the parking control unit 106, via the communication network 108. Further, in accordance with an embodiment, each vehicle may be configured to communicate with another vehicle within the set of first vehicles 102, via the communication network 108, by use of one or more communication protocols known in the art.

The first vehicle 102a may comprise a suitable logic, circuitry, interfaces, and/or code that may be configured to communicate with the other first vehicles 102b to 102f from the set of first vehicles 102, the second vehicle 104, and/or the parking control unit 106, via the communication network 108. The first vehicle 102a may be further configured to detect the presence of the other first vehicles 102b to 102f and the second vehicle 104 within a vicinity of the first vehicle 102a. The detection may be based on use of the imaging system 110a and/or the sensing system 110b of the ECU 110.

The second vehicle 104 may comprise a suitable logic, circuitry, interfaces, and/or code that may be configured to communicate with the set of first vehicles 102 and/or the parking control unit 106, via the communication network 108. The second vehicle 104 may correspond to a vehicle that may be in the process of parking at a space adjacent to the first vehicle 102a already parked in a parking area. In accordance with an embodiment, the second vehicle 104 may be already parked adjacent to the parked first vehicle 102a. In such a case, the second vehicle 104 may be in the process of vacating a parking space in the parking area.

The parking control unit 106 may comprise a suitable logic, circuitry, interfaces, and/or code that may be configured to monitor the parking area of the parking environment 100 wherein the set of first vehicles 102 and/or the second vehicle 104 may be parked. The parking control unit 106 may be further configured to capture one or more images of the parking area by use of one or more imaging devices. The parking control unit 106 may be further configured to detect the presence of the set of first vehicles 102 and/or the second vehicle 104 by use of the one or more imaging devices and/or sensing devices integrated within the parking control unit 106. In an implementation, the one or more imaging devices and/or the sensing devices may be installed at one or more locations in the parking area in a distributive manner, and may be communicatively coupled to a centrally located parking control unit 106. The one or more imaging devices and/or sensing devices may be configured to monitor the presence of the set of first vehicles 102 and/or the second vehicle 104 in the parking area. Further, the parking control unit 106 may be configured to update a map that may be based on the monitoring of the set of first vehicles 102 and/or the second vehicle 104.

The communication network 108 may include a medium through which the parking control unit 106, the set of first vehicles 102 and/or the second vehicle 104 may communicate with each other. Examples of the communication network 108 may include, but are not limited to, a dedicated short-range communication (DSRC) network, a mobile ad-hoc network (MANET), a vehicular ad-hoc network (VANET), Intelligent vehicular ad-hoc network (InVANET), Internet based mobile ad-hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the set of first vehicles 102, the second vehicle 104, and/or the parking environment 100 may be configured to connect to the communication network 108, in accordance with various wireless communication protocols. Examples of such wireless communication protocols may include, but are not limited to, IEEE 802.11, 802.11p, 802.15, 802.16, 1609, Worldwide Interoperability for Microwave Access (WiMAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term evolution (LTE), File Transfer Protocol (FTP), ZigBee, EDGE, infrared (IR), and/or Bluetooth (BT) communication protocols.

The ECU 110 may comprise suitable logic, circuitry, interfaces, and/or code that may be configured to compile parking information related to one or more vehicles in the vicinity of the first vehicle 102a. The parking information may include one or more images (of the one or more vehicles) captured by the imaging system 110a. The ECU 110 may be further configured to receive information (related to the one or more vehicles) detected by the sensing system 110b. Based on the parking information, the ECU 110 may be configured to communicate alerts, such as a parking alert, a parking violation alert, a parking violation ticket, and/or an acknowledgement message to other ECUs, components, and/or systems of the second vehicle 104, via the in-vehicle network (that may correspond to a vehicle area network (VAN)) and/or an in-vehicle data bus (such as a controller area network (CAN) bus).

The imaging system 110a may comprise suitable logic, circuitry, interfaces, and/or code that may be configured to capture images of one or more vehicles (such as other first vehicles 102b to 102f from the set of first vehicles 102 and/or the second vehicle 104) in the vicinity of the first vehicle 102a. The imaging system 110a may be further configured to capture images of one or more vacant parking spaces in the vicinity of the first vehicle 102a. In accordance with an embodiment, the imaging system 110a may be integrated within the body of the first vehicle 102a. In accordance with an embodiment, the imaging system 110a may be adjustably mounted on the body of the first vehicle 102a. The imaging system 110a may utilize an imaging device, a radio wave-based object detection device, a laser-based object detection device, and/or a wireless communication device, to detect the presence of the second vehicle 104. Examples of the imaging system 110a may include, but are not limited to, a dedicated front focus camera, a motion camera, a radio detection and ranging (RADAR) device coupled with a camera, and/or a light detection and ranging (LIDAR) device coupled with a camera.

The sensing system 110b may comprise suitable logic, circuitry, interfaces, and/or code that may be configured to detect the presence of one or more vehicles (such as other first vehicles 102b to 102f from the set of first vehicles 102, and/or the second vehicle 104) in the vicinity of the first vehicle 102a. The detected information may refer to one or more vehicles and/or one or more vacant parking spaces that may be available in the vicinity of the first vehicle 102a. The sensing system 110b may comprise sensors to detect a direction of travel, geospatial position, steering angle, yaw rate, speed, and/or rate of change of speed of the second vehicle 104. Examples of the sensing system 110b may include, but are not limited to, an ultrasonic sensor, an infrared sensor, a radio wave-based object detection sensor, a laser-based object detection sensor a vehicle speed sensor, an odometric sensor, a yaw rate sensor, a speedometer, a global positioning system (GPS), a steering angle detection sensor, a vehicle travel direction detection sensor, a magnetometer, and/or a touch sensor.

In operation, the set of first vehicles 102 may include one or more vehicles parked in a parking area. In accordance with an embodiment, the parking area may correspond to the parking environment 100 that may be a bay parking environment. However, a person with ordinary skill in the art will understand that the parking environment 100 may not be limited to the bay parking environment. The aspects disclosed herein may be also applicable to a parallel parking environment and/or other parking environments, without departure from the scope of the disclosure.

In accordance with an embodiment, an operational mode of one of the set of first vehicles 102, such as the first vehicle 102a, is switched ON, even after the ignition of the first vehicle 102a is turned OFF. The operational mode may correspond to generation of alerts, such as a parking alert, a parking violation alert, a parking violation ticket, and/or an acknowledgement message, to other vehicles. The alerts may be based on determination of a predetermined distance, such as a minimum safe distance at which parking vehicles, such as the second vehicle 104, may be safely parked at a parking space adjacent to the first vehicle 102a. In accordance with an embodiment, the minimum safe distance may be determined based on one or more of a size of the first vehicle 102a, a direction of the first vehicle 102a, lane marking on a surface where the first vehicle 102a is located, the size of the vacant parking space, margins for opening vehicle doors of the first vehicle 102a, and/or size of the parking vehicle (such as the second vehicle 104). In accordance with an embodiment, the minimum safe distance may correspond to the predetermined distance that may be provided by a user (not shown) of the first vehicle 102a.

The ECU 110 may be configured to continuously monitor the parking area, via a first set of sensors, such as ultrasonic sensors and/or image sensors, of the sensing system 110b. The sensing system 110b may detect one or more vehicles, such as the other first vehicles 102b to 102f, in the vicinity of the first vehicle 102a. In accordance with an embodiment, the second vehicle 104 may also be in the vicinity of the first vehicle 102a. Accordingly, the ECU 110 may perform one or more pre-set actions. Examples of the one or more pre-set actions, may include switching ON the imaging system 110a, establishing a communication channel (such as a vehicle-to-vehicle (V2V) communication channel), and activating a second set of sensors of the sensing system 110b. The communication channel may be based on the communication network 108 or the V2V communication channel. In accordance with an embodiment, based on the established communication channel, the ECU 110 of the first vehicle 102a may be configured to control one or more electronic devices in the one or more other vehicles. The electronic devices may correspond to an audio interface and/or a display screen associated with the ECU of the one or more other vehicles.

The ECU 110 may be configured to receive vehicle data from one or more vehicles, such as the other first vehicles 102b to 102f, via the V2V communication channel. The ECU 110 may be further configured to receive vehicle data from a vehicle, such as the second vehicle 104. The received vehicle data related to the other first vehicles 102b to 102f, and/or the second vehicle 104, may include, but not limited to, one or more of a DSRC identification, a latitude, a longitude, an elevation, a position accuracy, a transmission and a speed heading, a steering angle, an acceleration, a brake system status, a size, a direction, and/or other optional messages. The ECU 110 may further determine sizes of one or more vacant parking spaces in the vicinity of the first vehicle 102a, direction of the one or more vacant parking spaces with respect to the first vehicle 102a. Accordingly, the ECU 110 may be configured to generate a map of the parking area. Based on the generated map, the ECU 110 may be configured to determine one or more paths for way-outs in one or more directions, via which the first vehicle 102a may move out of its parking space in the parking area.

The imaging system 110a and the sensing system 110b in the ECU 110 may determine a movement of the second vehicle 104 in the parking area. The imaging system 110a and the sensing system 110b may determine parking information of the second vehicle 104. The parking information may include one or more of a direction of the second vehicle 104, a distance of the second vehicle 104, a location of the second vehicle 104 in the parking area, a brake system status of the second vehicle 104, a position accuracy of the second vehicle 104, a transmission and a speed heading and/or a steering angle of the second vehicle 104.

The ECU 110 may be configured to compare the parking information determined by the imaging system 110a and/or the sensing system 110b with the vehicle data, based on one or more parameters, such as speed, brake status, steering angle and/or direction. Based on the comparison, the ECU 110 of the first vehicle 102a may detect the parking vehicle identifier of the second vehicle 104.

In accordance with an embodiment, when the second vehicle 104 vacates the parking space adjacent to the first vehicle 102a, the ECU 110 may be configured to update the generated map based on the parking space vacated by the second vehicle 104. In such a case, the ECU 110 may switch OFF the imaging system 110a, terminate the V2V communication channel, and deactivate the second set of ultrasonic sensors of the sensing system 110b. The ECU 110 may further switch ON the first set of sensors of the sensing system 110b.

In accordance with an embodiment, when the second vehicle 104 approaches toward the parking space adjacent to the first vehicle 102a, the ECU 110 may be configured to monitor the movement of the second vehicle 104 within the parking area. Based on the monitored movement of the second vehicle 104, the ECU 110 may be configured to determine the direction in which the second vehicle 104 may be parked adjacent to the first vehicle 102a. In accordance with an embodiment, the ECU 110 may be configured to activate an associated guidance system (not shown), via the in-vehicle network, to guide the second vehicle 104 for safe parking. In accordance with an embodiment, the guidance system may comprise a laser projection unit. The guidance system may further comprise one or more proximity indicators, such as a buzzer and/or parking alert indicators. In an exemplary scenario, the laser projection unit of the first vehicle 102a may be configured to project a laser beam towards the direction of the second vehicle 104, based on the detection of the second vehicle 104 approaching toward the parking space adjacent to the first vehicle 102a. The projected laser beam may correspond to a visual indication of the minimum safe distance at which the second vehicle 104 may be parked adjacent to the first vehicle 102a, without generation of the parking violation alert. The visual indication may be in a rectangular shaped projection beam that may surround the first vehicle 102a. Such a rectangular shaped projection beam may indicate a border to prevent an invasion by the second vehicle 104.

In such a case, the ECU 110 may be configured to generate a parking alert for the second vehicle 104. The parking alert may assist the second vehicle 104 in parking at the predetermined distance, such as the minimum safe distance. The assistance may be provided, based on the parking alert that may be communicated to the second vehicle 104 by use of the established communication channel. In such a case, the ECU of the second vehicle 104 may be configured to render the received parking alert at the one or more electronic devices, based on the audio interface and/or the display screen associated with the ECU of the second vehicle 104.

In accordance with an embodiment, when the second vehicle 104 is detected within the determined minimum safe distance, after the communication of the parking alert, the ECU 110 may be configured to generate a parking violation alert. The ECU 110 may be further configured to communicate the generated parking violation alert to the second vehicle 104, via the established communication channel. In such a case, the ECU of the second vehicle 104 may be configured to render the received parking violation alert at the one or more electronic devices based on the audio interface and/or the display screen associated with the ECU of the second vehicle 104. The ECU 110 may be configured to communicate the parking violation alert again to the second vehicle 104 if the second vehicle 104 fails to correct the direction of approach toward the first vehicle 102a. The ECU 110 may start to capture and store still images or video streams by the imaging system 110a to identify the second vehicle 104 if the second vehicle 104 fails to correct the direction of approach toward the first vehicle 102a.

In accordance with an embodiment, the ECU 110 may be further configured to communicate the parking violation alert to the owner of the first vehicle 102a and/or an authority managing the parking environment 100, via the communication network 108, when the V2V communication channel is disrupted. In a particular instance, the ECU 110 may determine that the owner of the first vehicle 102a is outside the first vehicle 102a. In such a case, the ECU 110 may transmit a message of the parking violation alert and/or still images or video streams of the second vehicle 104 (captured by the imaging system 110a) to an electronic device, such as smartphone, of the owner of the first vehicle 102a. If there is a physical contact/accident between the first vehicle 102a and the second vehicle 104, the ECU 110 may further transmit related data and/or an emergency message to a predetermined e-mail address of the owner of the first vehicle 102a, via internet communication. In accordance with an embodiment, when the second vehicle 104 fails to correct the direction of approach toward the first vehicle 102a, the ECU 110 may communicate the parking violation alert information to the parking control unit 106. In such a case, the parking control unit 106 may verify the parking violation alert information and communicate a parking violation ticket to the second vehicle 104.

In accordance with an embodiment, when the second vehicle 104 is successfully parked at or beyond the determined minimum safe distance, the ECU 110 may be configured to generate an acknowledgement message. The ECU 110 may be further configured to communicate the generated acknowledgement message to the second vehicle 104, via the established communication channel. Accordingly, the ECU 110 may be configured to update the generated map, based on the parking space occupied by the second vehicle 104. In accordance with an embodiment, the ECU 110 may continue to monitor the other first vehicles 102*b* to 102*f* (of the set of first vehicles 102) and/or the second vehicle 104, based on the imaging system 110*a* and/or the sensing system 110*b*.

In accordance with another aspect of the disclosure, the parking control unit 106 may be configured to detect the presence of one or more vehicles, such as the set of first vehicles 102 and/or the second vehicle 104, based on infrastructure-to-vehicle (I2V) communication channel established with the set of first vehicles 102 and/or the second vehicle 104, via the communication network 108. The detection of the set of first vehicles 102 and/or the second vehicle 104 may be further based on one or more imaging devices and/or sensing devices integrated with the parking control unit 106. In accordance with an embodiment, the second vehicle 104 may be parked adjacent to the first vehicle 102*a* (the set of first vehicles 102). The parking control unit 106 may continue to monitor the one or more vehicles, such as the set of first vehicles 102, in the parking area.

The parking control unit 106 may receive vehicle data from the set of first vehicles 102, such as the set of first vehicles 102, and/or the second vehicle 104, via a vehicle-to-infrastructure (V2I) communication channel. The vehicle data may include one or more of a DSRC identification, a latitude, a longitude, an elevation, a position accuracy, a transmission and a speed heading, a steering angle, an acceleration, a brake system status, a size, a minimum predetermined safe distance, a direction, an identifier, and/or other optional messages.

The parking control unit 106 may further capture one or more images of the parking environment 100, via the imaging devices 306 and determine the parking status information of the parking environment 100. Accordingly, a map may be generated based on the determined parking status information, received vehicle data and/or the captured one or more images. In accordance with an embodiment, the parking control unit 106 may be further configured to store the generated map in a local memory.

In accordance with an embodiment, as described above, the second vehicle 104 may correspond to a vehicle already parked at the parking space in the parking area. In such a case, the second vehicle 104 may vacate the parking space adjacent to the first vehicle 102*a*. The parking control unit 106 may be configured to continuously monitor the second vehicle 104 and update the generated map, based on the parking space vacated by the second vehicle 104.

In accordance with an embodiment, the detected second vehicle 104 may correspond to a vehicle that enters the parking area in search of a vacant parking space. The parking control unit 106 may be configured to establish the I2V communication channel with the second vehicle 104. Based on the established I2V communication channel, the parking control unit 106 may be further configured to transmit information that corresponds to a vacant parking space, based on the generated map. In accordance with an embodiment, the vacant parking space may be adjacent to or in the vicinity of the first vehicle 102*a*. The parking control unit 106 may be further configured to communicate parking alert to the second vehicle 104, via the established I2V communication channel. In accordance with an embodiment, the parking alert may include parking guidelines, such as, but not limited to, a minimum safe distance for parking a vehicle adjacent to one of the set of first vehicles 102 and/or a location of the vacant parking space based on the received vehicle data, such as the size of the first vehicle 102 and the second vehicle 104.

In accordance with an embodiment, the parking control unit 106 may be configured to monitor the movement and/or direction of the second vehicle 104 within the parking area. The parking control unit 106 may be further configured to transmit information related to the movement and/or direction of the second vehicle 104 to one or more of the set of first vehicles 102, via the communication network 108.

In accordance with an embodiment, based on the monitoring of the second vehicle 104, the parking control unit 106 may determine that the movement and/or the direction of motion of the second vehicle 104 are not in accordance with the communicated parking alert. For example, the second vehicle 104 may be detected within the determined minimum safe distance with respect to a parked vehicle, such as the first vehicle 102*a*. In such a case, the parking control unit 106 may be configured to generate a parking violation alert for the second vehicle 104. The parking control unit 106 may be configured to communicate the generated parking violation alert to the second vehicle 104, via the established I2V communication channel. The generated parking violation alert may include an identification of the parked vehicle, such as the first vehicle 102, of which minimum determined safe distance is invaded.

In accordance with an embodiment, the parking control unit 106 may be configured to communicate the generated parking violation alert again to the second vehicle 104 for a pre-defined duration, after the generation of the parking violation alert. The parking control unit 106 may be further configured to monitor the movement and/or direction of motion of the second vehicle 104 during the pre-defined duration. Based on the monitored movement and/or direction of motion of the second vehicle 104, when the second vehicle 104 fails to correct the direction of approach toward the first vehicle 102*a*, the parking control unit 106 may be further configured to issue a parking violation ticket for the second vehicle 104.

Figure 2:
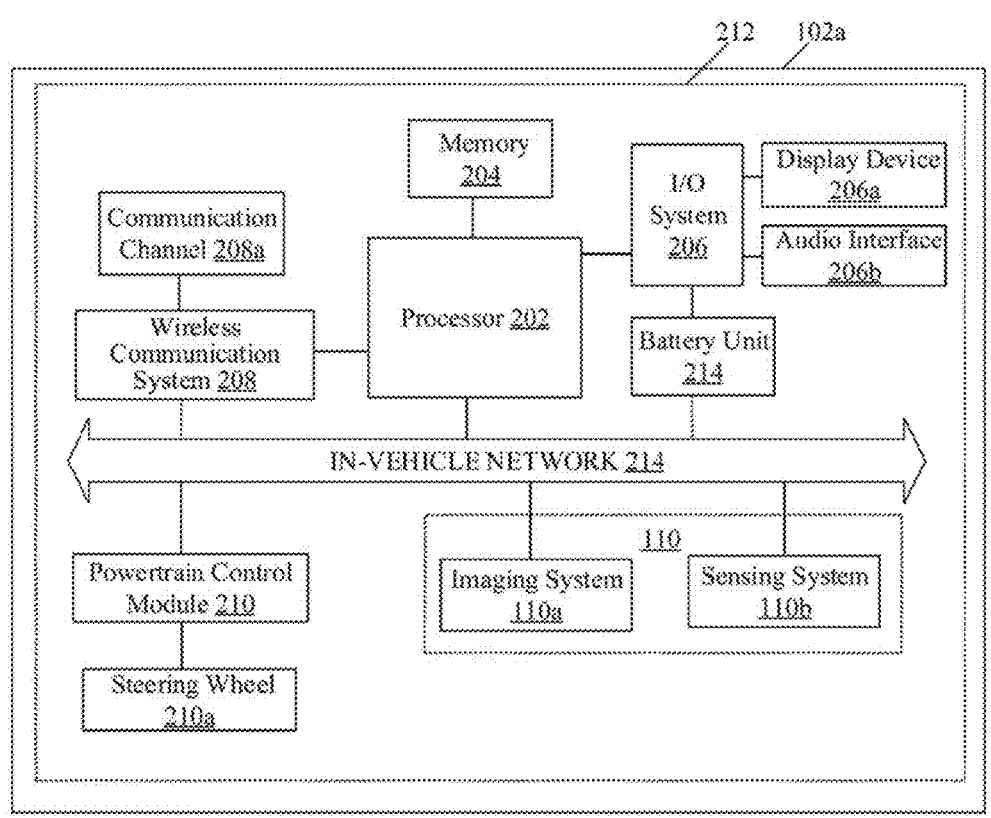
FIG. 2 is a block diagram that illustrates various exemplary components and systems of a vehicle that generates a parking alert, in accordance with an embodiment of the disclosure.

FIG. 2 is a block diagram that illustrates various exemplary components and systems of a vehicle for generation of parking alert, in accordance with an embodiment of the disclosure. FIG. 2 is explained in conjunction with elements from FIG. 1. With reference to FIG. 2, there is shown various exemplary components and systems of the first vehicle 102*a*. The first vehicle 102*a* may comprise a processor 202 and a memory 204. The first vehicle 102*a* may further comprise an input/output (I/O) system 206, a wireless communication system 208, powertrain control module 210, a vehicle body 212, and/or battery unit 214. The I/O system 206 may include a display device 206*a* and an audio interface 206*b*. The wireless communication system 208 may include a V2V communication channel 208*a*. The first vehicle 102*a* may further comprise the ECU 110 that includes the imaging system 110*a* and the sensing system 110*b*, as described in FIG. 1. A person with ordinary skill in the art will understand that in accordance with an embodiment, the electronic components of the first vehicle 102*a*, such as the processor 202, the memory 204, the sensing system 110b, the imaging system 110a, the I/O system 206, and/or the wireless communication system 208, may be embedded in the ECU 110.

The various components and systems may be communicatively coupled to each other, via the in-vehicle network 216. The processor 202 may be communicatively coupled to the sensing system 110b, the imaging system 110a, the I/O system 206, the wireless communication system 208, the powertrain control module 210, and the vehicle body 212, via the in-vehicle network 216. The wireless communication system 208 may be configured to communicate with one or more other vehicles, via the V2V communication channel 208a. A person with ordinary skill in the art will understand that the first vehicle 102a may also include other suitable components and systems, but for brevity, those components and systems, which are used to describe and explain the function and operation of the present disclosure are illustrated herein.

The processor 202 may comprise suitable logic, circuitry, interfaces, and/or code that may be configured to execute a set of instructions stored in the memory 204. The processor 202 may be implemented, based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 204 may comprise suitable logic, circuitry, and/or interfaces that may be configured to store a machine readable code and/or a computer program with at least one code section executable by the processor 202. The memory 204 may be configured to store a map that may correspond to a presence of one or more vehicles, such as the set of first vehicles 102, and/or vacant parking spaces, in the vicinity of the first vehicle 102a. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The I/O system 206 may comprise various input and output devices that may be configured to communicate with the processor 202. The I/O system 206 may be configured to render the one or more images captured by the imaging system 110a, via the display device 206a. The display device 206a may refer to a touch screen that may be configured to render the one or more images, captured by the imaging system 110a. Examples of the display device 206a may include, but are not limited to, a heads up display (HUD), an augmented reality heads up display (AR-HUD), a driver information console (DIC), a see-through display, a projection-based display, a smart-glass display, and/or an electrochromic display. The audio interface 206b may refer to a speaker, chime, buzzer, or other such device that may generate sound. The audio interface 206b may also refer to a microphone or other such device that may receive a voice input from an occupant of the first vehicle 102a, such as the driver.

The wireless communication system 208 may comprise suitable logic, circuitry, interfaces, and/or code that may be configured to communicate with other first vehicles 102b to 102f (of the set of first vehicles 102) and/or the second vehicle 104, via the V2V communication channel 208a. The wireless communication system 208 may include components such as, an antenna, a telematics unit, a radio frequency (RF) transceiver, one or more amplifiers, one or more oscillators, a digital signal processor, a near field communication (NFC) circuitry, a coder-decoder (CODEC) chipset, a subscriber identity module (SIM) card, and/or the like. The V2V communication channel 208a may include a medium through which the wireless communication system 208 of the first vehicle 102a may communicate with a wireless communication system of other first vehicles 102b to 102f. Examples of the wireless communication system 208 may include, but are not limited to, a cellular network, such as a long-term evolution (LTE) network, a Wireless Fidelity (Wi-Fi) network, a Wireless Local Area Network (WLAN), the Internet, a dedicated short-range communication (DSRC) network, a mobile ad-hoc network (MANET), a vehicular ad-hoc network (VANET), and/or a Metropolitan Area Network (MAN). Examples of the second communication protocol, such as a wireless communication protocol, may include but are not limited to cellular communication protocols, such as Long-term Evolution (LTE), a wireless fidelity (Wi-Fi) protocol, a DSRC protocol, IEEE 802.11, 802.11p, 802.15, 802.16, 1609, Worldwide Interoperability for Microwave Access (Wi-MAX), Wireless Access in Vehicular Environments (WAVE), Transmission Control Protocol and Internet Protocol (TCP/IP), User Datagram Protocol (UDP), Hypertext Transfer Protocol (HTTP), ZigBee, EDGE, and/or Bluetooth (BT) communication protocols.

The powertrain control module 210 may refer to an electronic system installed in the first vehicle 102a that executes a plurality of functions associated with the vehicle. Such plurality of functions may comprise control of the ignition system, fuel injection system, emission system, power transmission system, and/or the like. In accordance with an embodiment, the powertrain control module 210 may be configured to control the transmission of the power generated by the engine of the first vehicle 102a to the steering wheel 210a, via a conventional driveline known in the art. The powertrain control module 210 may refer to a manual transmission, a synchronized transmission, a fully automatic transmission, a semi-Automatic transmission, a Continuously Variable Transmission (CVT), a sequential transmission, dual clutch transmission (DCT), or other transmission known in the art.

The steering wheel 210a may be configured to receive one or more commands from the processor 202 and/or the powertrain control module 210. In accordance with an embodiment, the steering wheel 210a may control direction of movement of the first vehicle 102a. Examples of the steering wheel 210a may include, but are not limited to, a power assisted steering system, a vacuum/hydraulic based steering system, an electro-hydraulic power assisted system (EHPAS), or a "steer-by-wire" steering system known in the art.

The vehicle body 212 may refer to an outer shell of the first vehicle 102a (other than chassis) that includes various components and systems, and other mechanical and electrical workings or components of the first vehicle 102a. A body type of the vehicle body 212 may be unitized body (unibody), body on frame, body with ancillary sub-frames, dual frame body, and/or other body structures known in the art. A body style of the vehicle body 212 may be a sports utility vehicle (SUV), a multi-utility vehicle (MUV), a coupe utility vehicle, a van, a truck, a sedan, a coupe, a convertible, a hatchback, a sports car, and/or other body styles known in the art.

The battery unit 214 may provide power to various components and systems that may perform one or more actions associated with the first vehicle 102a. Such one or more actions may correspond to a start operation, an ignition operation and/or a lighting operation of one or more electronic systems associated with the first vehicle 102a. For example, based on the power provided by the battery unit 214, the display device 206a and/or audio interface 206b of the I/O system 206, may be powered ON. The battery unit 214 may comprise one or more batteries that may correspond to a lead-acid type battery, a nickel metal hydride battery, a lithium ion battery, and/or the like.

The in-vehicle network 216 may include a medium through which the various components and systems of the first vehicle 102a communicate with each other. Various standard formats may be defined for the interchange of messages between the various components and systems. Such standard formats may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD)-based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or a Local Interconnect Network (LIN).

In operation, the operational mode (that corresponds to generation of a parking alert) of the first vehicle 102a may be switched ON, even after the ignition of the first vehicle 102a is turned OFF. The processor 202 may be configured to continuously monitor the parking area, via a first set of sensors, such as ultrasonic sensors and/or image sensors of the sensing system 110b. When the sensing system 110b detects one or more vehicles, such as the other first vehicles 102b to 102f, in the vicinity of the first vehicle 102a, the processor 202 may perform one or more pre-set actions. Examples of the one or more pre-set actions may include switching ON the imaging system 110a, establishing the V2V communication channel 208a, and activating a second set of sensors of the sensing system 110b. The V2V communication channel 208a may be one of the various instances of the wireless communication system 208. In accordance with an embodiment, based on the established V2V communication channel 208a, the processor 202 of the first vehicle 102a may be configured to communicate with one or more electronic devices in the one or more other vehicles. The one or more electronic devices may correspond to audio interfaces and/or a display screen associated with the ECUs of the one or more other vehicles.

The processor 202 may be configured to receive vehicle data from the one or more vehicles, such as the other first vehicles 102b to 102f, via the established V2V communication channel 208a. The processor 202 may be further configured to receive vehicle data from the second vehicle 104. The received vehicle data related to the other first vehicles 102b to 102f and/or the second vehicle 104, may include, but not limited to, a DSRC identification, a latitude, a longitude, an elevation, a position accuracy, a transmission and a speed heading, a steering angle, an acceleration, a brake system status, a size, a direction, and/or other optional messages. The processor 202 may further determine sizes of one or more vacant parking spaces in the vicinity of the first vehicle 102a, direction of the one or more vacant parking spaces with respect to the first vehicle 102a.

In accordance with an embodiment, based on the detection of the other first vehicles 102b to 102f and/or the second vehicle 104, the processor 202 may be configured to generate a map of the parking area. The processor 202 may be further configured to store the generated map in the memory 204. Based on the generated map, the processor 202 may be configured to determine one or more directions from which the first vehicle 102a may move out of the parking area. In accordance with an embodiment, the processor 202 may be configured to determine an identification of the one or more vehicles of the detected other first vehicles 102b to 102f which may be parked adjacent to the first vehicle 102a. The determination of the identification of the other first vehicles 102b to 102f may be based on one or more algorithms. The one or more algorithms may correspond to a text-recognition technique, object-recognition technique, image-recognition technique, and/or the like, known in the art.

In accordance with an embodiment, the processor 202 may be configured to compare parking information (determined by the imaging system 110a and/or the sensing system 110b) with the vehicle data received via the V2V communication channel 208a. The parking information may be associated with the second vehicle 104. In accordance with an embodiment, the parking information may include one or more of a position accuracy of the second vehicle 104, a transmission and a speed heading, a steering angle of the second vehicle 104, acceleration of the second vehicle 104, brake system status of the second vehicle 104, size of one or more vacant parking spaces in the vicinity of the first vehicle 102a, direction of the one or more vacant parking spaces with respect to the first vehicle 102a, size of the second vehicle 104, direction of the second vehicle 104, and/or identifier of the second vehicle 104. Based on the comparison, the processor 202 may be configured to detect the parking vehicle identifier of the second vehicle 104.

The processor 202 may be configured to determine a movement of the second vehicle 104 in the parking area, based on the imaging system 110a and the sensing system 110b. The imaging system 110a may be configured to capture one or more images that may correspond to the second vehicle 104 and/or the other first vehicles 102b to 102f, a direction in which the other first vehicles 102b to 102f and/or the second vehicle 104 are parked, and/or the lane markings on a road surface where the first vehicle 102a is parked. In accordance with an embodiment, the processor 202 may be configured to determine a minimum safe distance at which one or more vehicles, such as the second vehicle 104, may be parked adjacent to the first vehicle 102a, without generation of a parking alert. The adjacency may be towards left, right, front or rear side direction of the first vehicle 102a. In accordance with an embodiment, the minimum safe distance at which the second vehicle 104 may correspond to a predetermined distance that may be provided by a user (not shown) of the first vehicle 102a. Such a predetermined distance may be stored in the memory 204. In accordance with an embodiment, the determined minimum safe distance may be based on one or more of a size of the first vehicle 102a, a direction of the first vehicle 102a, lane marking on a surface where the first vehicle 102a is located, the size of the vacant parking space, and/or size of the detected second vehicle 104.

In accordance with an embodiment, when the detected second vehicle 104 corresponds to the vehicle parking at a parking space adjacent to the first vehicle 102a, the processor 202 may be configured to determine a direction of approach of the second vehicle 104, based on the parking information. In accordance with an embodiment, the processor 202 may be configured to activate one or more I/O devices of the I/O system 206, based on the determined direction in which the second vehicle 104 may be parked with respect to the first vehicle 102a. In accordance with an embodiment, based on the one or more I/O devices of the I/O system 206, a laser beam may be projected. The projected laser beam may correspond to a visual indication of the determined minimum safe distance at which the second vehicle 104 may be parked, without generation of a parking violation alert. In accordance with an embodiment, the one or more I/O devices may further comprise one or more proximity indicators, such as a horn, a buzzer and/or parking alert indicators. The audio interface 206b may be configured to generate audio output associated with the proximity indicators.

In accordance with an embodiment, based on the V2V communication channel 208a, the processor 202 may be configured to communicate with the one or more electronic devices in the second vehicle 104. The one or more electronic devices may correspond to an audio interface and/or a display screen associated with the ECU of the second vehicle 104. The processor 202 may be further configured to transmit the generated audio output associated with the proximity indicators to the audio interface and/or a display screen of the second vehicle 104.

In accordance with an embodiment, when the determined direction of approach of the second vehicle 104 is such that the minimum safe distance for parking adjacent to the first vehicle 102a may be breached, the processor 202 may be configured to generate a parking alert for providing assistance to the second vehicle 104. The parking alert may include an identification of the first vehicle 102a, the determined minimum safe distance for parking, and/or a direction that corresponds to the determined minimum safe distance. The message format of the parking alert may be: <Vehicle ID><Minimum safe distance to be maintained (in ft.)><Minimum safe distance to be maintained in which side>. An example of the parking alert may be "<WBZ9038><3><Left side>", where "WBZ9038" is the identifier of the first vehicle 102a, "3" is the minimum safe distance to be maintained (in feet), and "Left side" direction in which is minimum safe distance is to be maintained. The processor 202 may be configured to communicate the generated parking alert to the second vehicle 104, by use of the established V2V communication channel 208a.

In accordance with an embodiment, the generated parking alert may correspond to a visual indication. Such a visual indication may be communicated to the second vehicle 104 based on the blinking of the one or more proximity indicators. The visual indication may further correspond to one or more user-interface (UI) objects that may be communicated to the ECU of the second vehicle 104. The ECU of the second vehicle 104 may be configured to display the received UI object on the display device associated with the ECU of the second vehicle 104. In accordance with an embodiment, the generated parking alert may correspond to an audio indication that may be communicated to the second vehicle 104, based on the established V2V communication channel 208a. The audio indication may be communicated to the ECU of the second vehicle 104 that may be rendered based on the audio interface associated with the ECU of the second vehicle 104. Notwithstanding, the disclosure may not be so limited, and the generated parking alert may further correspond to a combination of the visual and audio indications, without departure from the scope of the disclosure.

In accordance with an embodiment, the processor 202 may be configured to continue to monitor the second vehicle 104, based on the imaging system 110a and/or the sensing system 110b. In accordance with an embodiment, the processor 202 may be configured to continue the communication of the generated parking alert to the second vehicle 104, until the second vehicle 104 is successfully parked beyond the minimum safe distance from the first vehicle 102a.

In accordance with an embodiment, the processor 202 may be configured to generate a parking violation alert when the second vehicle 104 is detected within the determined minimum safe distance. In accordance with an embodiment, the processor 202 may be configured to generate the parking violation alert and communicate the generated parking violation alert to the second vehicle 104. In accordance with an embodiment, the parking violation alert may include at least an identification of the first vehicle 102a, a notification that corresponds to violation of the minimum safe distance, a direction of violation of the minimum safe distance, and/or a distance by which the minimum safe distance is violated by the second vehicle 104. The message format of the parking violation alert may be: <Vehicle ID><Alert message><Safe distance violation><Side towards which the minimum safe distance has been violated>. An example of the parking alert may be "<WBZ9038><Safe Distance Violated><2><Left side>", where "WBZ9038" is the identifier of the first vehicle 102a, "Safe Distance Violated" is the alert message, "2" is the distance by which the minimum safe distance is violated, and "Left side" is the side towards which the minimum safe distance is violated.

The processor 202 may be further configured to communicate the generated parking violation alert to the second vehicle 104, via the V2V communication channel 208a. In accordance with an embodiment, the ECU of the second vehicle 104 may be configured to render the received parking violation alert on the one or more electronic devices, based on the audio interface and/or the display screen associated with the ECU of the second vehicle 104. Notwithstanding, the disclosure may not be so limited, and the parking violation alert may be generated when the direction of approach of the second vehicle 104 corresponds to one or more directions from which the first vehicle 102a may be moved out, without departure from the scope of the disclosure.

In accordance with an embodiment, after the communication of the parking violation alert, the processor 202 may be configured to indicate the violation of the minimum safe distance by use of the one or more I/O devices of the I/O system 206. In an instance of the embodiment, when the minimum safe distance is breached by the second vehicle 104, the processor 202 may be configured to indicate the parking violation, based on the blinking of the one or more proximity indicators, such as the parking alert indicators. In accordance with an embodiment, the processor 202 may be further configured to indicate the parking violation, based on honking by the buzzers in the I/O system 206. In accordance with an embodiment, the generated parking violation alert may be rendered on the display device 206a and/or the audio interface 206b of the first vehicle 102a. The power to the display device 206a and/or the audio interface 206b may be provided by the battery unit 214. This may be done in order to alert a user present inside the second vehicle 104 in a timely manner to avoid a collision. Further, the processor 202 of the first vehicle 102a may be configured to retract one or more projecting components that may be retractable into the vehicle body 212.

In accordance with an embodiment, the processor 202 may be further configured to communicate the parking violation alert to the owner of the first vehicle 102a and/or an authority managing the parking environment 100, when the V2V communication channel 208a, is not possible with the second vehicle 104. In accordance with an embodiment, based on the violation of the minimum safe distance, the authority managing the parking environment 100 may be alerted based on a message that may comprise identifier of the first vehicle 102a. The message may further comprise information of the owner of the second vehicle 104.

In accordance with an embodiment, the processor 202 may be configured to operate the first vehicle 102a in an autonomous mode. In such a scenario, the powertrain control module 210, in conjunction with the processor 202, may be configured to move the first vehicle 102a when the second vehicle 104 is parked within the minimum safe distance of the first vehicle 102a. In such a case, the processor 202 may be configured to retrieve the map stored in the memory 204. Based on the position of the other first vehicles 102b to 102f, in the map, the processor 202 may be further configured to determine whether the position of the first vehicle 102a may be adjusted, such that the second vehicle 104 is at or beyond the minimum safe distance. In such a case, the adjustment of the position of the first vehicle 102a may be based on the steering wheel 210a, and the powertrain control module 210. The powertrain control module 210 may be configured to control the transmission of the power generated by the engine to move the first vehicle 102a from the parked position. Further, the steering wheel 210a may be configured to adjust the direction of the first vehicle 102a.

In accordance with an embodiment, the generated parking violation alert may be communicated to the parking control unit 106. The parking control unit 106 may be configured to verify the parking violation by the second vehicle 104, based on one or more imaging devices and/or sensing devices associated with the parking control unit 106. Based on the verification of the parking violation alert, the parking control unit 106 may be configured to issue a parking violation ticket to the second vehicle 104.

In accordance with an embodiment, when the second vehicle 104 is successfully parked at or beyond the determined minimum safe distance, the processor 202 may be configured to generate an acknowledgement message. The message format of the acknowledgement message may be: <Vehicle ID><Message>. An example of the parking alert may be "<WBZ9038><Thank you for parking your vehicle within 3 ft. on the left side>", where "WBZ9038" is the identifier of the first vehicle 102a, and "Thank you for parking your vehicle within 3 ft. on the left side" is the acknowledgement message. The processor 202 may be further configured to communicate the generated acknowledgement message to the second vehicle 104, based on the V2V communication channel 208a. The processor 202 may be configured to update the map stored in the memory 204, based on the successful parking of the second vehicle 104.

In accordance with an embodiment, the processor 202 may be configured to monitor the other first vehicles 102b to 102f, and/or the second vehicle 104, based on the imaging system 110a and/or the sensing system 110b. In accordance with an embodiment, the second vehicle 104 may vacate the parking space adjacent to the first vehicle 102a. The processor 202 may be configured to update the map stored in the memory 204, based on the parking space vacated by the second vehicle 104.

Figure 3:
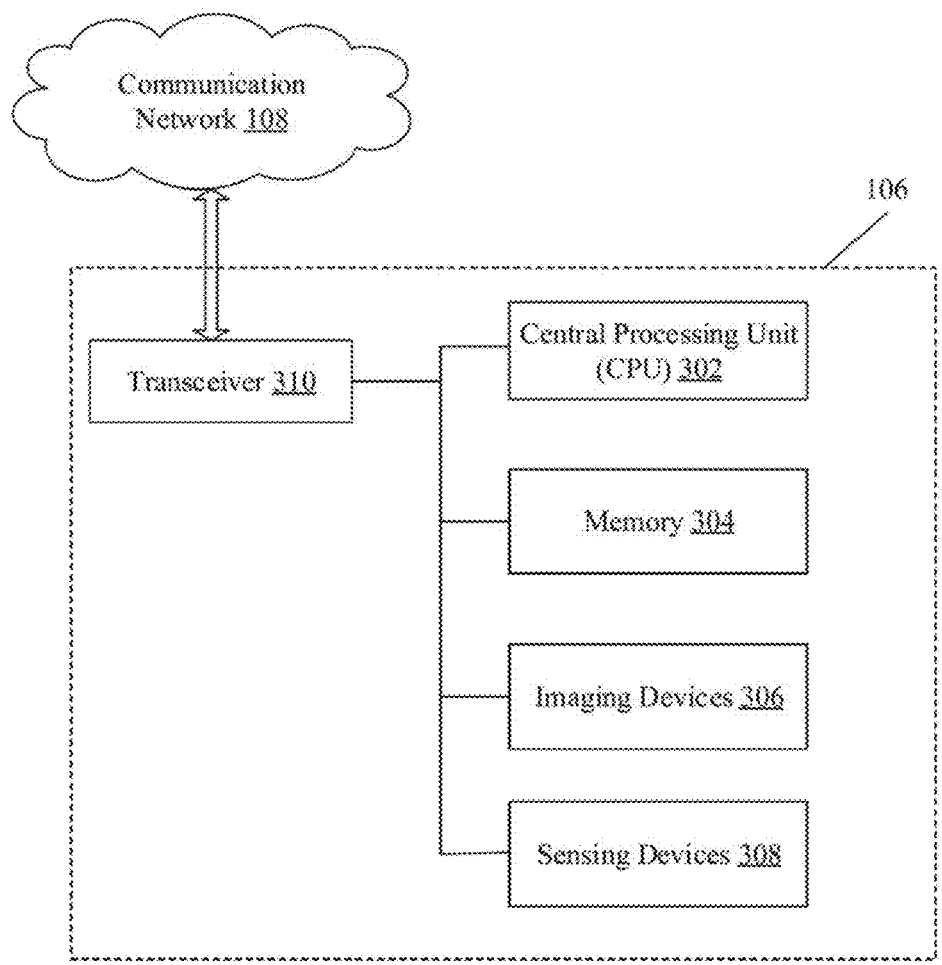
FIG. 3 is a block diagram that illustrates an exemplary parking control unit that generates a parking alert, in accordance with an embodiment of the disclosure.

FIG. 3 is a block diagram that illustrates an exemplary parking control unit that generates a parking alert, in accordance with an embodiment of the disclosure. FIG. 3 is explained in conjunction with elements from FIG. 1. With reference to FIG. 3, the parking control unit 106 may comprise one or more circuits, such as a central processing unit (CPU) 302, a memory 304, imaging devices 306, sensing devices 308, and a transceiver 310.

The CPU 302 may comprise suitable logic, circuitry, interfaces, and/or code that may be configured to execute a set of instructions stored in the memory 304. The CPU 302 may be implemented, based on a number of processor technologies known in the art. Examples of the CPU 302 may be an X86-based processor, a Reduced Instruction Set Computing (RISC) processor, an Application-Specific Integrated Circuit (ASIC) processor, a Complex Instruction Set Computing (CISC) processor, a microcontroller, a graphics processing unit (GPU), a state machine, and/or other processors or circuits.

The memory 304 may comprise suitable logic, circuitry, and/or interfaces that may be configured to store the one or more algorithms for generation of a parking alert. The memory 304 may be further configured to store a machine code and/or a set of instructions executable by the CPU 302. The memory 304 may be configured to store a map that corresponds to each vehicle parked in the parking area monitored by the parking control unit 106. Examples of implementation of the memory 304 may include, but are not limited to, Random Access Memory (RAM), Electrically Erasable Programmable Read-Only Memory (EEPROM), Read Only Memory (ROM), Hard Disk Drive (HDD), and/or a Secure Digital (SD) card.

The imaging devices 306 may comprise suitable logic, circuitry, interfaces, and/or code that may be configured to capture one or more images. The captured one or more images may correspond to the one or more vehicles parked in the parking area monitored by the parking control unit 106. The imaging devices 306 may be located at one or more locations in the parking area, and may be configured to communicate the captured one or more images to the CPU 302. Examples of the imaging devices 306 may include, but are not limited to, a motion camera, a radio detection and ranging (RADAR) device coupled with a camera, and/or a light detection and ranging (LIDAR) device coupled with a camera.

The sensing devices 308 may comprise suitable logic, circuitry, interfaces, and/or code that may be configured to detect the one or more vehicles parked in the parking area monitored by the parking control unit 106. The sensing devices 308 may be located at one or more locations in the parking area and may be configured to transmit the detected information to the CPU 302. The sensing system 110b may comprise sensors to detect a direction of travel, geospatial position, steering angle, yaw rate, speed, and/or rate of change of speed of the one or more vehicles. The sensing devices 308 may be further configured to detect one or more vacant parking spaces in the parking area. Examples of the sensing system 110b may include, but are not limited to, an ultrasonic sensor, an infrared sensor, an image sensor, a radio wave-based object detection sensor, a laser-based object detection sensor, a vehicle speed sensor, an odometric sensor, a yaw rate sensor, a speedometer, a global positioning system (GPS), a steering angle detection sensor, a vehicle travel direction detection sensor, a magnetometer, and/or a touch sensor.

The transceiver 310 may comprise suitable logic, circuitry, interfaces, and/or code that may be configured to communicate with one or more external network elements, such as the set of first vehicles 102 and/or the second vehicle 104. Such communication with the one or more external network elements may occur by use of the communication network 108. The transceiver 310 may include various components, examples of which may include, but are not limited to, an antenna, a radio frequency (RF) transceiver, one or more amplifiers, one or more oscillators, a digital signal processor, a coder-decoder (CODEC) chipset, and/or a subscriber identity module (SIM) card. The transceiver 310 may communicate, via wireless communication, with networks, such as the communication network 108. The wireless communication may use one or more of a plurality of communication standards, protocols and technologies, as described above for the V2V communication channel 208*a* of the wireless communication.

In operation, the CPU 302 may be configured to monitor one or more vehicles, such as the set of first vehicles 102 and/or the second vehicle 104, in the parking area. The CPU 302 may be configured to detect the presence of the one or more vehicles (such as the other first vehicles 102*b* to 102*f* and/or the second vehicle 104) that may be parked adjacent to the first vehicle 102*a*. The detection of the set of first vehicles 102 and/or the second vehicle 104 may be based on the imaging devices 306 and/or the sensing devices 308. In accordance with an embodiment, the CPU 302 may be configured to communicate with the detected set of first vehicles 102 and/or the second vehicle 104, based on I2V communication channel established via the transceiver 310. Based on the established I2V communication channel, the CPU 302 may be configured to receive vehicle data from the set of first vehicles 102 and/or the second vehicle 104. The received vehicle data may include one or more of a DSRC identification, a latitude, a longitude, an elevation, a position accuracy, a transmission and a speed heading, a steering angle, an acceleration, a brake system status, a size, a direction, an identifier, and/or other optional messages.

The CPU 302 may be configured to determine parking status information based on the vehicle data received from the set of first vehicles 102, the second vehicle 104, and/or one or more images of the parking environment 100 captured by the imaging devices 306. The parking status information may comprise one or more of an availability of a nearest parking space adjacent to one or more of the set of first vehicles 102, a size of an available nearest parking space adjacent to the one or more of the set of first vehicles 102, a size of the one or more of the set of first vehicles 102, and a minimum predetermined safe distance with respect to the one or more of the set of first vehicles 102.

In accordance with an embodiment, based on the detection of the set of first vehicles 102 and/or the second vehicle 104, determined parking status information, received vehicle data, and/or the captured one or more images, the CPU 302 may be configured to generate a map of the parking area. The generated map may be stored in the memory 304. The generated map may include, but is not limited to, the number of vehicles parked in the parking area, the location of each of the parked vehicles in the parking area, the size of each of the first vehicles, the number of vacant parking spaces in the parking area, and/or a size of each of the vacant parking spaces. The CPU 302 may be further configured to determine one or more paths for movement of each of the set of first vehicles 102 and/or the second vehicle 104, based on the determined parking status information.

In accordance with an embodiment, the second vehicle 104 may correspond to the vehicle already parked in the parking space, such as the set of first vehicles 102. The CPU 302 may be configured to monitor each of the set of first vehicles 102 and/or the second vehicle 104, based on the imaging devices 306, sensing devices 308, and/or the established I2V communication channel. In accordance with an embodiment, the second vehicle 104 may vacate the parking space adjacent to the first vehicle 102*a*. The CPU 302 may be configured to update the generated map based on the current parking status information, such as a parking space vacated by the second vehicle 104, received from the set of first vehicles 102 and/or the second vehicle 104.

In accordance with an embodiment, the second vehicle 104 may enter the parking area in search of a vacant parking space. The CPU 302 may be configured to detect the presence of the second vehicle 104 based on the imaging devices 306 and/or the sensing devices 308. In accordance with an embodiment, the CPU 302 may be configured to establish I2V communication channel with the second vehicle 104, via the transceiver 310. In accordance with an embodiment, the second vehicle 104 may transmit a request for allocation of a parking space, for a vacant parking space, to the CPU 302, based on the established I2V communication channel.

In accordance with an embodiment, the CPU 302 may be configured to retrieve the map stored in the memory 304. Based on the retrieved map, the CPU 302 may be configured to transmit information that corresponds to a vacant parking space. In accordance with an embodiment, the vacant parking space may be adjacent to the first vehicle 102*a*. The adjacency may be towards left, right, front or rear side direction of the first vehicle 102*a*. The CPU 302 may be further configured to communicate a parking alert to the second vehicle 104, via the established I2V communication channel. The parking alert may include one or more parking guidelines for providing assistance to the second vehicle 104 for parking at the vacant parking space, adjacent to the first vehicle 102*a*.

In accordance with an embodiment, the CPU 302 may be configured to monitor the movement of the second vehicle 104 in the parking area, based on the imaging devices 306 and/or the sensing devices 308. The CPU 302 may be further configured to determine the direction in which the second vehicle 104 may be parked. In accordance with an embodiment, the movement and/or the direction of motion of the second vehicle 104 may not be in accordance with the communicated one or more parking guidelines in the parking alert. In such a case, the CPU 302 may be configured to generate a parking violation alert based on the current parking status information of the second vehicle 104. The CPU 302 may be further configured to communicate the generated parking alert to the second vehicle 104, via the established I2V communication channel. In accordance with an embodiment, the CPU 302 may be further configured to communicate the generated parking alert to the first vehicle 102*a*, via the transceiver 310. The CPU 302 may be further configured to transmit information of the second vehicle 104 to one or more of the set of first vehicles 102, by use of the established I2V communication channel, via the transceiver 310. Such information may correspond to a notification that comprises the monitored movement and/or the direction of motion of the second vehicle 104.

In accordance with an embodiment, the CPU 302 may be configured to communicate the generated parking violation alert again to the second vehicle 104 for a pre-defined duration, after the generation of the parking violation alert. The CPU 302 may continue to monitor the movement and/or direction of motion of the second vehicle 104, via the imaging devices 306 and/or the sensing devices 308. Based on the monitored movement and/or direction of motion of the second vehicle 104, when the second vehicle 104 fails to correct the direction of approach toward the first vehicle 102a, the CPU 302 may be configured to issue a parking violation ticket for the second vehicle 104. In accordance with an embodiment, the issuance of the parking violation ticket may be based on verification of a parking violation alert generated by the first vehicle 102a, when the second vehicle 104 is parked within the minimum safe distance of the first vehicle 102a.

Figure 4A:
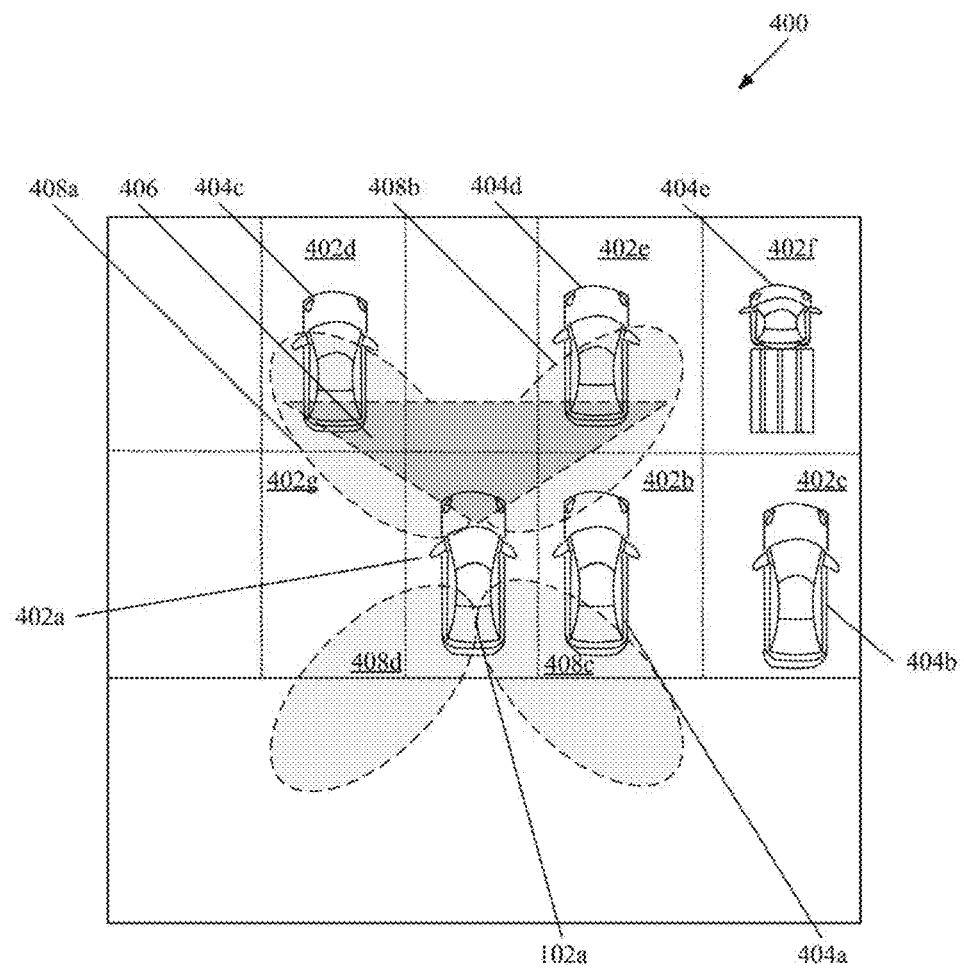
FIGS. 4A and 4B illustrate exemplary scenarios for generation of a parking alert by a vehicle, in accordance with an embodiment of the disclosure.
Figure 4B:
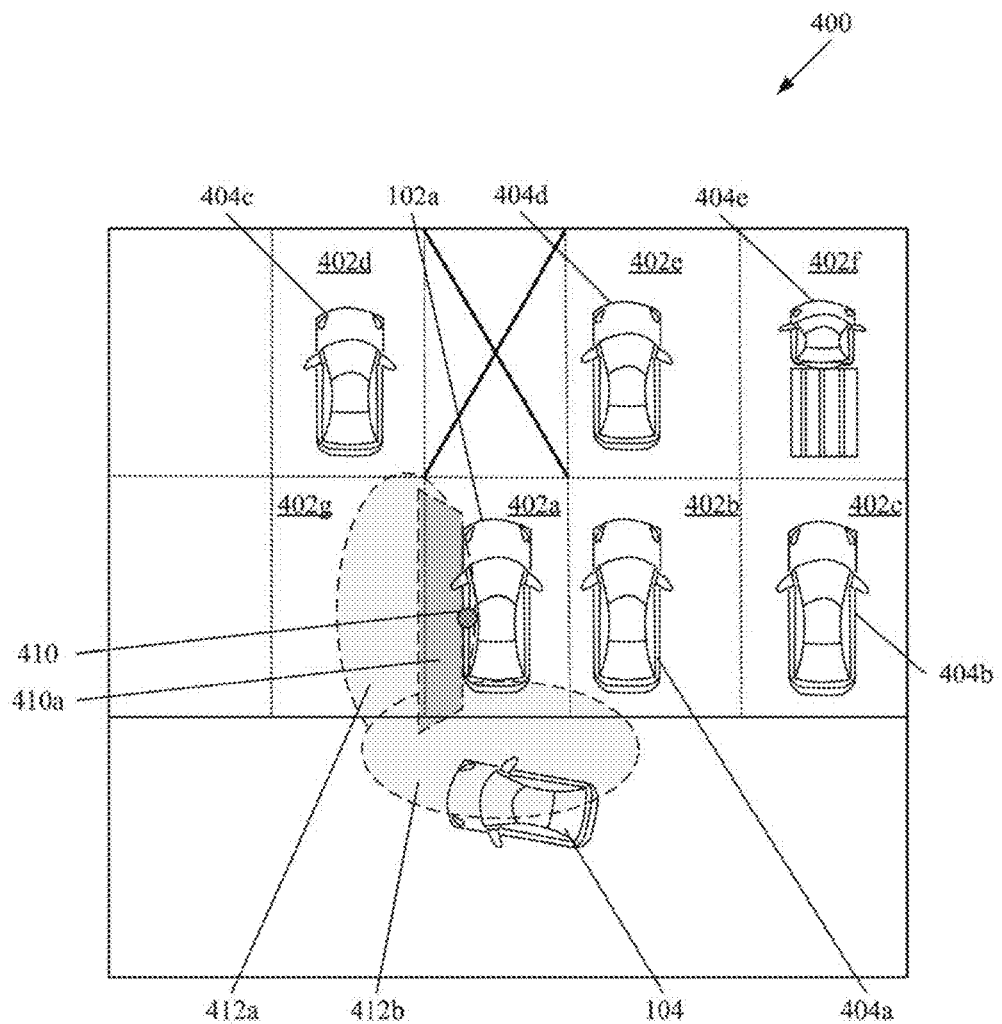

FIGS. 4A and 4B illustrate exemplary scenarios for generation of a parking alert by a vehicle, in accordance with an embodiment of the disclosure. FIGS. 4A and 4B are explained in conjunction with elements from FIGS. 1 and 2. With reference to FIG. 4A, there is shown a parking environment 400. The parking environment 400 may correspond to a parking area that may comprise a plurality of parking spaces, such as the parking spaces 402a to 402g. In accordance with an embodiment, the parking environment 400 may correspond to a bay parking environment. However, a person with ordinary skill in the art will understand that the aspects disclosed herein may be also be applicable to a parallel parking environment and/or other parking environments, without departure from the scope of the disclosure. The vehicles 404a to 404e may correspond to the other first vehicles 102b to 102f from the set of first vehicles 102 explained in FIG. 1. The parking environment 400 may further comprise the first vehicle 102a, which may be parked at the parking space 402a. The parking environment 400 may further comprise the vehicles 404a to 404e, which may be parked at the parking spaces 402b to 402f, respectively.

In accordance with an exemplary scenario, the first vehicle 102a may be parked at the parking space 402a, such that a parking alert generation mode is switched ON, even after the ignition is turned OFF. In the parking alert generation mode, the imaging system 110a and/or the sensing system 110b may remain operational even after a user of the first vehicle 102a turns OFF the ignition.

In accordance with an instance of the exemplary scenario, the processor 202 may be configured to detect the presence of the vehicles 404a to 404e and/or the second vehicle 104 (not shown in FIG. 4A), which may be parked in the vicinity of the first vehicle 102a. The detection of the vehicles 404a to 404e may be based on use of the imaging system 110a, that has been explained with respect to FIG. 1. The imaging system 110a may be configured to capture one or more images of the vehicles present in the field-of-view (FOV) 406 of the imaging system 110a. The vehicles that may be present in the FOV 406 of the imaging system 110a may comprise the vehicles 404c and/or 404d. In accordance with an exemplary scenario, the FOV 406 of the imaging system 110a or a sonar system may correspond to a 360 degree view of the parking environment 100. In such a scenario, the one or more images captured by the imaging system 110a may include the vehicles 404a to 404e. The captured one or more images may correspond to the second vehicle 104 and/or the vehicles 404a to 404e, a direction in which the vehicles 404a to 404e and/or the second vehicle 104 may be parked, and/or the lane markings on a surface where the first vehicle 102a is parked.

In accordance with an instance of the exemplary scenario, the sensing system 110b of the first vehicle 102a may be configured to detect one or more vehicles that may be present in the vicinity of the first vehicle 102a. Examples of the sensing system 110b may include, but are not limited to, an ultrasonic sensor, an infrared sensor, an image sensor, a radio wave-based object detection sensor, a laser-based object detection sensor a vehicle speed sensor, an odometric sensor, a yaw rate sensor, a speedometer, a global positioning system (GPS), a steering angle detection sensor, a vehicle travel direction detection sensor, a magnetometer, and/or a touch sensor. The sensing system 110b may comprise one or more sensors that may be configured to detect the vehicles (in the vicinity of the first vehicle 102a) in coverage regions 408a, 408b, 408c, and/or 408d. The vehicles detected by the sensing system 110b may correspond to the vehicles 404a, 404c, and 404d. The vehicles 404b and 404e may not be detected by the sensing system 110b, as the vehicles 404b and 404e are located beyond the coverage regions 408a to 408d of the sensing system 110b. Further, the sensing system 110b may detect that the parking space (between the parking spaces 402d and 402e) is not available. For example, in case of the parking space (between the parking spaces 402d and 402e) is a reserved parking space, and a sign-board (depicting "Reserved Parking") may be displayed. In such a case, an object and/or image recognition sensors in the sensing system 110b may detect and communicate such non-availability of the parking space to the processor 202 of the first vehicle 102a.

In accordance with an exemplary scenario, the imaging system 110a and/or the sensing system 110b may be configured to communicate the parking information to the processor 202. Based on the parking information, the processor 202 may be configured to generate a map that corresponds to the location of the detected vehicles parked 404a to 404e. Additionally, the processor 202 may be further configured to identify one or more parking spaces, such as a parking space 402g, adjacent to the parking space 402a of the first vehicle 102a (which may be vacant). The processor 202 may be further configured to store the generated map in the memory 204. Based on the generated map, the processor 202 may be configured to determine one or more directions from which the first vehicle 102a may be moved out of the parking environment 400.

Further, based on the parking information, the processor 202 may be further configured to determine the identification and size of a vehicle, the size of a parking space, lane markings of a parking space, and/or the direction a vehicle is parked in the vicinity of the first vehicle 102a.

In accordance with an exemplary scenario, when one or more of the vehicles 404a to 404e, vacate the corresponding parking spaces, the imaging system 110a and/or the sensing system 110b, may be configured to detect the corresponding vacated parking spaces. Based on the detection of the vacated parking spaces, the processor 202 may be configured to update the generated map with one or more detected vacant parking spaces.

In accordance with an exemplary scenario, based on the generated map, the processor 202 may be configured to activate one or more sensors that correspond to the coverage regions 408a, 408c, and 408d. The one or more sensors that correspond to the coverage region 408b may not be activated as the parking space 402e in the vicinity of the parking space 402a is occupied by the vehicle 404d. However, the one or more sensors that correspond to the coverage region 408b may be activated when the vehicle 404d vacates the parking space 402e. The selective activation of the one or more sensors of the sensing system 110b may be performed to reduce the power requirement for generation of the parking violation alert.

With reference to FIG. 4B, there is shown the parking environment 400. In addition to the elements disclosed in FIG. 4A, the parking environment 400 may further comprise one or more vehicles, such as the second vehicle 104, which may enter the parking environment 400 in search of a vacant parking space. The first vehicle 102a, depicted in FIG. 4B, may comprise a laser projection unit 410 that may project the laser beam 410a, to indicate a minimum safe distance with respect to the first vehicle 102a. The laser projection unit 410 may be configured to receive control instructions from the I/O system 206, via the in-vehicle network 216. Further, the laser projection unit 410 may be configured to project the laser beam 410a with a visible light in one or more directions around the first vehicle 102a to show an area that indicates the minimum safe distance of the first vehicle 102a. The determination of the direction for projection of the laser beam 410a, around the first vehicle 102a, may be based on the direction of approach of the second vehicle 104. In accordance with an exemplary scenario, the laser projection unit 410 may correspond to the display device 206a.

In accordance with an exemplary scenario, the sensing system 110b of the first vehicle 102a may be configured to activate one or more sensors in the directions 412a and 412b, toward the left side and the rear side, respectively, of the first vehicle 102a. The directions 412a and 412b may correspond to a relative direction of the vacant parking space 402g from the first vehicle 102 and the way out of the first vehicle 102a from the parking space 402a, respectively. The sensor toward the front of the first vehicle 102a may not be activated as the parking space (between the parking spaces 402d and 402e) may not be available. For example, in case of ongoing maintenance work of the parking space (between the parking spaces 402d and 402e), a sign-board (depicting "Maintenance work in progress") may be displayed. In such a case, an object and/or image recognition sensors of the sensing system 110b may detect and communicate such non-availability of the parking space to the processor 202 of the first vehicle 102a. Consequently, the sensor toward the front of the first vehicle 102a may not be activated.

In accordance with an exemplary scenario, the second vehicle 104 may be detected by the imaging system 110a and/or the sensing system 110b of the first vehicle 102a. The processor 202 may be further configured to determine information that may include, but is not limited to, the size of one or more vacant parking spaces (such as the vacant parking space 402g in the vicinity of the parking space 402a of the first vehicle 102a), direction of the one or more vacant parking spaces with respect to the first vehicle 102a, size of the second vehicle 104, direction of the second vehicle 104, and/or identifier of the second vehicle 104. The determined information may further include a direction of approach of the second vehicle 104. In accordance with an instance of the exemplary scenario, the second vehicle 104 may approach toward the parking space 402g from the direction 412b of the first vehicle 102a.

In accordance with an exemplary scenario, the processor 202 may establish the V2V communication channel 208a, with the second vehicle 104. Based on the established V2V communication channel 208a and the map stored in the memory 204, the first vehicle 102a may be configured to suggest a vacant parking space 402g where the second vehicle 104 may be parked.

Based on the determined information, the processor 202 may be configured to determine a minimum safe distance, at which the second vehicle 104 may be parked, without generation of a parking alert, as explained in FIG. 2. The processor 202 may be further configured to activate the laser projection unit 410. The laser projection unit 410 may be configured to project the laser beam 410a that may correspond to a visual indication of the determined minimum safe distance. Further, the direction in which the laser beam 410a may be projected may be based on the direction of approach of the second vehicle 104. In accordance with an instance of the exemplary scenario, the laser beam 410a may be projected in the direction that corresponds to the vacant parking space 402g.

In accordance with another exemplary scenario, when the direction of approach of the second vehicle 104 is detected such that the second vehicle 104 may parked within the minimum safe distance projected by the laser beam 410a, the processor 202 may be configured to generate a parking alert. The generated parking alert may be communicated to the second vehicle 104 by use of the established V2V communication channel 208a. In accordance with an instance of the exemplary scenario, the generation of the parking alert may be communicated to the second vehicle 104, based on the blinking of the buzzer and/or the parking alert indicators and/or honking by the I/O system 206 of the first vehicle 102a.

In an instance, when the second vehicle 104 corrects the direction of approach toward the vacant parking space 402g, such that it will be parked at or beyond the projected minimum safe distance, the communication of the parking alert may be discontinued by the processor 202. Further, when the second vehicle 104 is successfully parked at the parking space 402g, at or beyond the projected minimum safe distance, the processor 202 may be configured to generate an acknowledgement message. The generated acknowledgement message may be communicated to the second vehicle 104, based on the established V2V communication channel 208a. In accordance with an exemplary scenario, the generated acknowledgement message may include, but is not limited to, the identification of the first vehicle 102a and/or the distance at which the second vehicle 104 is parked adjacent to the first vehicle 102a.

In another instance, when the second vehicle 104 does not correct the direction of approach toward the vacant parking space 402g, the processor 202 may be configured to generate a parking violation alert. In accordance with an exemplary scenario, the parking violation alert may be generated when the second vehicle 104 is detected within the projected minimum safe distance of the first vehicle 102a, for a time duration that exceeds a pre-defined duration. The generated parking violation alert may be generated at the first vehicle 102a and communicated to the second vehicle 104, via the established V2V communication channel 208a. The generated parking violation alert may be communicated to the second vehicle 104, based on the blinking of the buzzer, the parking alert indicators, and/or the honking by the I/O system 206 of the first vehicle 102a. Further, the processor 202 may be configured to communicate the generated parking violation alert to the parking control unit 106 and/or the owner of the first vehicle 102a, via the communication network 108. The parking control unit 106 may verify the received parking violation alert and may issue a parking violation ticket to the owner of the second vehicle 104.

Figure 5:
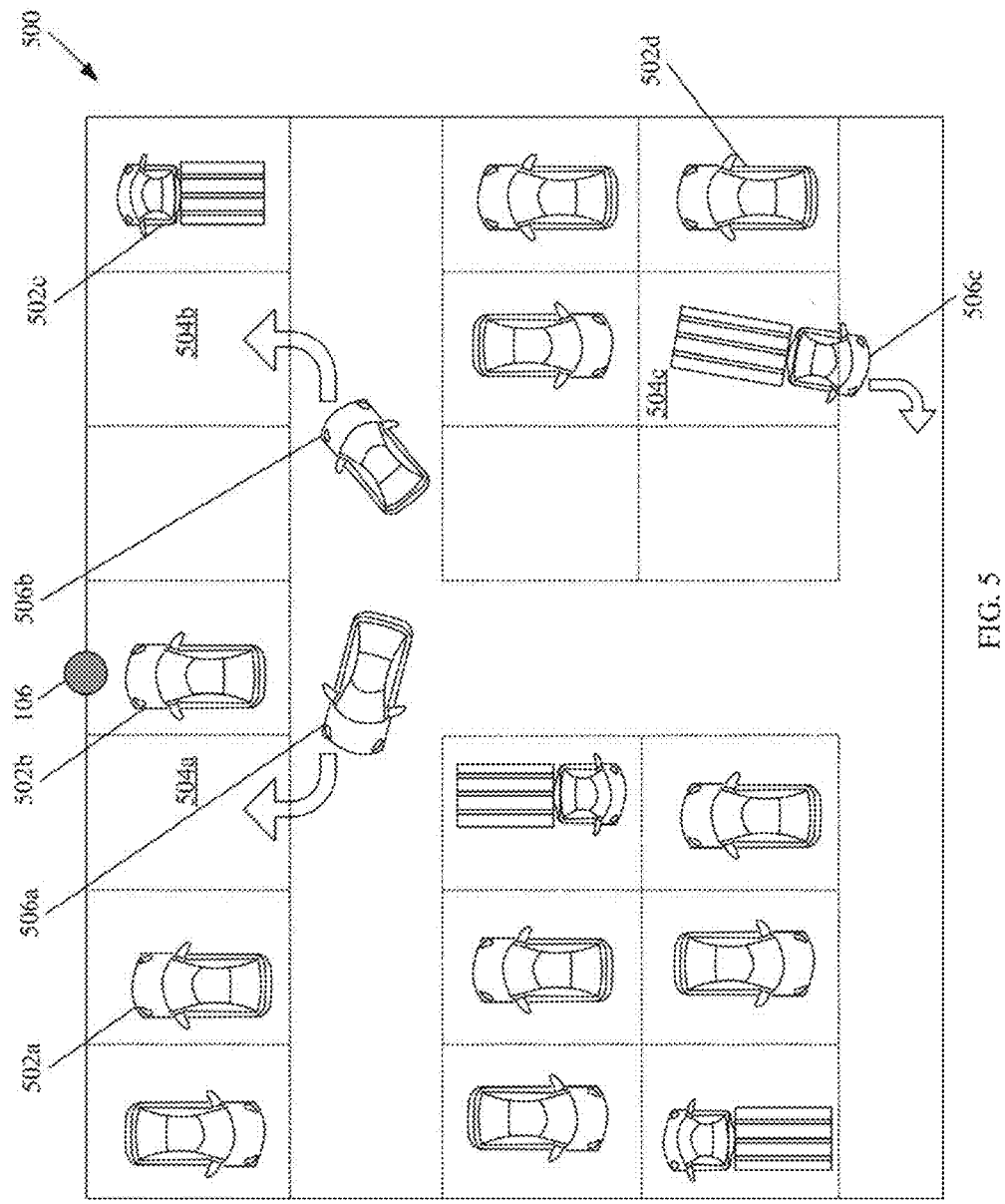
FIG. 5 illustrates an exemplary scenario for generation of a parking alert by a parking control unit, in accordance with an embodiment of the disclosure.

FIG. 5 illustrates an exemplary scenario for generation of a parking alert by a parking control unit, in accordance with an embodiment of the disclosure. FIG. 5 is explained in conjunction with elements from FIGS. 1, 2, and 3. With reference to FIG. 5, there is shown a bay parking environment 500. The bay parking environment 500 may comprise the parking control unit 106 that may be configured to monitor a plurality of vehicles in the bay parking environment 500. The plurality of vehicles may correspond to the set of first vehicles 102 in the bay parking environment 500. In accordance with an exemplary scenario, the set of first vehicles 102 may comprise one or more vehicles, such as the vehicles 502a, 502b, 502c, and 502d. In accordance with an exemplary scenario, the vehicles 502a, 502b, 502c, and 502*d* may be equipped with imaging systems and sensing systems, similar to the imaging system 110*a* and the sensing system 110*b* of the first vehicle 102*a* (FIG. 1), to detect the presence of the one or more vehicles in the bay parking environment 500. A person of ordinary skill in the art will understand that the aspects disclosed herein may be also be applicable to a parallel parking environment and/or other parking environments, without departure from the scope of the disclosure.

In accordance with an exemplary scenario, the bay parking environment 500 may further comprise vacant parking spaces, such as the parking spaces 504*a* and 504*b*. The parking space 504*a* may be located between the vehicles 502*a* and 502*b*. The parking space 504*b* may be located to the left of the vehicle 502*c*. The parking space 504*c*, located to the left of the vehicle 502*d*, when the vehicle 506*c* moves out and vacates the parking space 504*c* of the bay parking environment 500. The bay parking environment 500 may further comprise one or more vehicles, such as the vehicles 506*a* and 506*b* that may enter the bay parking environment 500 in search of vacant parking spaces.

In accordance with an exemplary scenario, the CPU 302 may be configured to establish I2V communication channel with the vehicles 502*a* to 502*c* and/or the vehicle 506*c*, in the bay parking environment 500. The CPU 302 may be configured to establish the I2V communication channel, with the vehicles 506*a* and 506*b*. In accordance with the exemplary scenario, the vehicle 506*a* may be detected by the vehicles 502*a* and/or 502*b*. The vehicle 506*b* may be detected by the vehicle 502*c*. Further, the parking space vacated by the vehicle 506*c* may be detected by the vehicle 502*d*. The vehicles 502*a*, 502*b*, 502*c*, and 502*d* may communicate the detected information to the CPU 302, via the I2V communication channel.

In accordance with an exemplary scenario, the vehicles 506*a* and/or 506*b* may be detected by the imaging devices 306 and/or the sensing devices 308 of the parking control unit 106. The imaging devices 306 and/or the sensing devices 308 may be further configured to determine one or more of a DSRC identification, a latitude, a longitude, an elevation, a position accuracy, a transmission and a speed heading, a steering angle, an acceleration, a brake system status, a size, a direction, an identifier, and/or other optional messages, related to each of the vehicles 506*a*, 506*b*, and/or 502*a* to 502*d*. In accordance with an exemplary scenario, the aforementioned may be determined based on the parking status information received from the vehicles 502*a*, 502*b*, 502*c*, and 502*d*, via the I2V communication channel. Further, the vacated parking space 504*c* may be detected by the imaging devices 306 and/or the sensing devices 308 of the parking control unit 106. The CPU 302 may be configured to generate a map of the bay parking environment 500 based on the current parking status information. The generated map may be stored in the memory 304.

In accordance with an exemplary scenario, the CPU 302 may be configured to communicate an alert to the vehicles 506*a* and/or 506*b*, via the I2V communication channel. The parking alert may include, but are not limited to, a minimum safe distance for the vehicles 506*a*, 506*b*, and 506*c* adjacent to the vehicles 502*a* to 502*d*, and/or a location of the vacant parking space based on the size of the vehicles 506*a* and/or 506*b*.

In accordance with an exemplary scenario, when the vehicles 506*a* and/or 506*b* are detected within the minimum safe distance of the vehicles 502*a* and 502*b*, and 502*c*, respectively, the CPU 302 may be configured to generate a parking violation alert. The parking violation alert may be generated when one or more of the vehicles 506*a* and/or 506*b* violate the parking alert. The CPU 302 may be further configured to communicate the generated parking violation alert to the vehicles 506*a* and/or 506*b* that violate the parking alert. The parking violation alert may be communicated to the vehicles 506*a* and/or 506*b*, via the I2V communication channel. The CPU 302 may be further configured to communicate the generated parking alert to the one or more of the owners of the vehicles 502*a*, 502*b*, and 502*c*.

The CPU 302 may be further configured to receive the current vehicle data after the generation of the parking violation alert. In accordance with an embodiment, the CPU 302 may be further configured to monitor the movement, direction, and/or direction of motion of the vehicles 506*a* and 506*b*, based on the imaging devices 306 and/or the sensing devices 308. Based on the monitoring, when the vehicles 506*a* or 506*b* do not follow the parking guidelines as indicated by the parking alert, the CPU 302 may be further configured to communicate the parking violation alert again. The generated parking violation alert may be communicated to the vehicles 506*a* and/or 506*b* again, via the I2V communication channel.

In accordance with an exemplary scenario, the CPU 302 may be configured to issue a parking violation ticket that corresponds to the vehicle that violates the parking violation alert, such as the vehicles 506*a* and/or 506*b*. In accordance with an embodiment, the issuance of the parking violation ticket may be based on a verification of a parking violation alert, when the vehicles 506*a* and/or 506*b*, are parked within the minimum safe distance of at least one of the vehicles 502*a* to 502*c*.

In accordance with an exemplary scenario, the CPU 302 may be further configured to update the map based on the parking space 504*c*, vacated by the vehicle 506*c*. The updated map may be stored in the memory 304. In accordance with an exemplary scenario, the CPU 302 may be configured to broadcast the information of the vacated parking space 504*c* to the vehicles 502*a* to 502*d*.

Figure 6A:
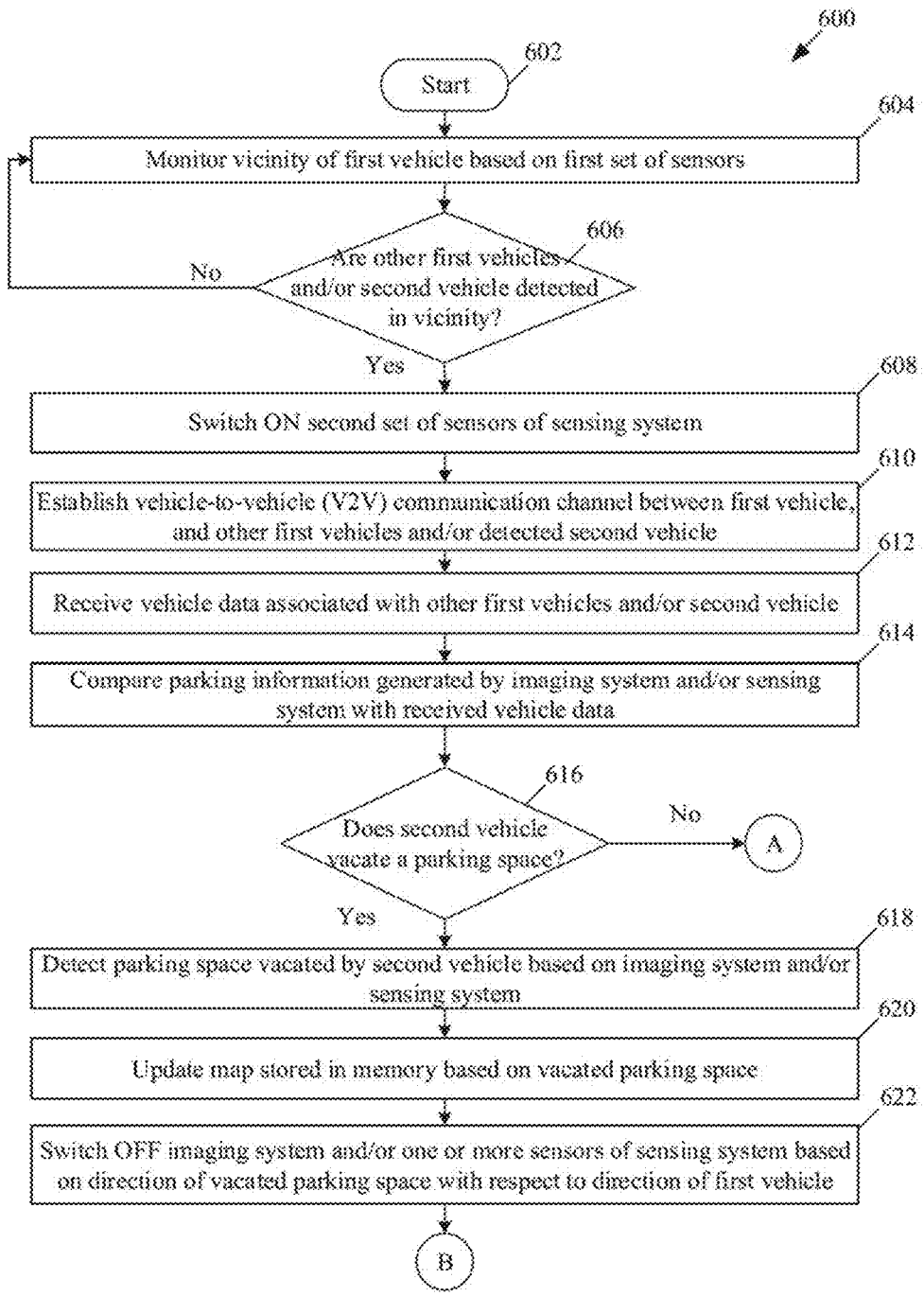
FIGS. 6A and 6B collectively depict a first flowchart that illustrates a first exemplary method implemented in a vehicle for generation of a parking alert, in accordance with an embodiment of the disclosure.
Figure 6B:
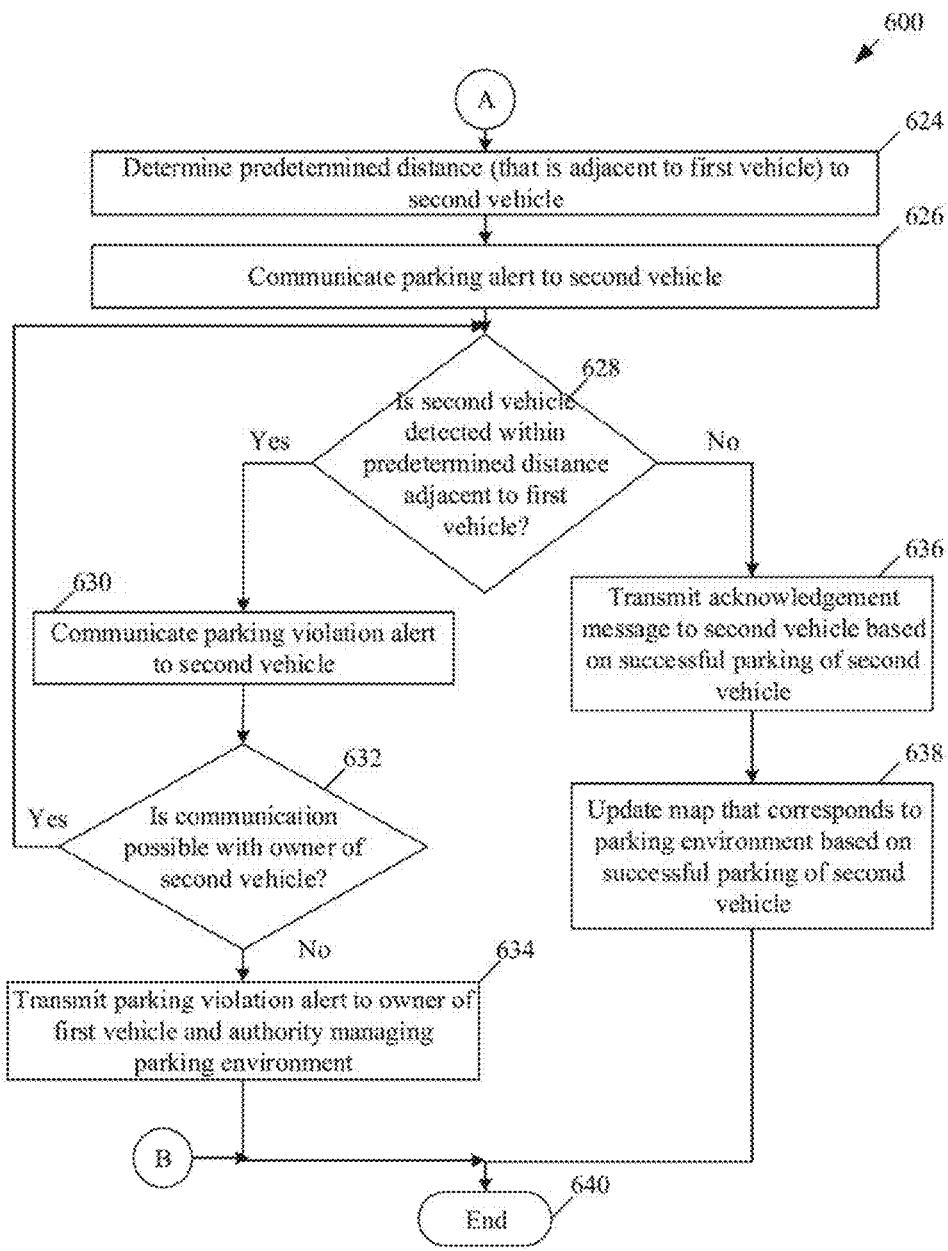

FIGS. 6A and 6B collectively depict a first flowchart that illustrates a first exemplary method implemented in a vehicle for generation of a parking alert, in accordance with an embodiment of the disclosure. With reference to FIGS. 6A and 6B, there is shown a first flowchart 600. The first flowchart 600 is described in conjunction with FIG. 1 and FIG. 2. The method starts at step 602 and proceeds to step 604.

At step 604, the vicinity of the first vehicle 102*a* may be monitored, based on a first set of sensors, such as ultrasonic sensors of the sensing system 110*b*, by the processor 202, as described in FIG. 2. At step 606, based on the monitored vicinity by the first set of sensors of the sensing system 110*b*, it may be determined whether the other first vehicles 102*b* to 102*f* and/or the second vehicle 104 are detected in the vicinity of the first vehicle 102*a*. In instances when the other first vehicles 102*b* to 102*f* and/or the second vehicle 104 are detected within the vicinity of the first vehicle 102*a*, the control passes to the step 608. In instances when the other first vehicles 102*b* to 102*f* and/or the second vehicle 104 are not detected in the vicinity of the first vehicle 102*a*, the control passes to the step 604.

At step 608, the imaging system 110*a* and a second set of sensors of the sensing system 110*b*, may be switched ON, as described in FIG. 2. At step 610, the V2V communication channel 208*a* may be established between the first vehicle 102*a* and the detected other first vehicles 102*b* to 102*f*. The V2V communication channel 208*a* may also be established between the first vehicle 102*a* and the second vehicle 104 that may be parked in the parking environment 100, within the vicinity of the first vehicle 102*a*. The establishment of the V2V communication channel 208*a* may be based on the wireless communication system 208.

At step 612, vehicle data associated with the other first vehicles 102*b* to 102*f* and the second vehicle 104 may be received, via the V2V communication channel 208*a*. The vehicle data may include, but is not limited to, one or more of a DSRC identification, a latitude, a longitude, an elevation, a position accuracy, a transmission and a speed heading, a steering angle, an acceleration, a brake system status, a size, a direction, and/or other optional messages.

At step 614, the parking information determined by the imaging system 110*a* and/or the sensing system 110*b* may be compared with the vehicle data received via the V2V communication channel 208*a*, by the processor 202. The parking information may be associated with the second vehicle 104, and may be determined by the imaging system 110*a* and/or the sensing system 110*b*. Based on the comparison, the parking vehicle identifier of the second vehicle 104 may be detected.

At step 616, it may be determined, by the processor 202, whether the second vehicle 104 corresponds to a vehicle that is vacating a parking space or a vehicle that is in the process of parking at a parking space, in the parking environment 100. Such a parking space may be adjacent to the first vehicle 102*a*. The adjacency may be towards left, right, front or rear side direction of the first vehicle 102*a*. In instances when the second vehicle 104 corresponds to a vehicle vacating the parking space, the control passes to step 618. In instances when the second vehicle 104 corresponds to a vehicle parking at the parking space, the control passes to step 624.

At step 618, when the second vehicle 104 corresponds to a vehicle vacating the parking space, the parking space vacated by the second vehicle 104 may be detected by the imaging system 110*a* and/or the sensing system 110*b* of the first vehicle 102*a*, as explained in FIG. 1. At step 620, the map that corresponds to the parking environment 100, stored in the memory 204, may be updated based on the vacated parking space. At step 622, based on the direction of the vacated parking space with respect to the direction of the first vehicle 102*a*, the imaging system 110*a* and/or the one or more sensors of the sensing system 110*b* may be switched OFF. Control passes to end step 640.

At step 624, when the second vehicle 104 corresponds to a vehicle parking at a parking space available adjacent to the first vehicle 102*a*, a predetermined distance, such as the minimum safe parking distance, for parking a vehicle adjacent to the first vehicle 102*a* may be determined by the processor 202, as explained in FIG. 2. The determination of the predetermined distance may be based on one or more of the size of the first vehicle 102*a*, direction of the available parking space with respect to the first vehicle 102*a*, lane marking on a surface where the first vehicle 102*a* is located, size of the vacant parking space, and/or size of the detected second vehicle 104. At step 626, a parking alert may be communicated to the second vehicle 104, via the V2V communication channel 208*a*, when the direction of approach of the second vehicle 104 is such that it may be parked adjacent to the first vehicle 102*a*, within the determined minimum safe distance of the first vehicle 102*a*. The parking alert may provide a parking assistance to the second vehicle 104. The message format of the parking alert may be: <Vehicle ID><Minimum safe distance to be maintained (in ft.)><Minimum safe distance to be maintained in which side>, as described in FIG. 2.

At step 628, it may be determined whether the second vehicle 104 is detected within the predetermined distance, such as the determined minimum safe distance, adjacent to the first vehicle 102*a*. In instances when the second vehicle 104 is detected within the predetermined distance, the control passes to step 630. In instances when the second vehicle 104 is detected at or beyond the predetermined distance, the control passes to step 636.

At step 630, when the second vehicle 104 is detected within the predetermined distance, a parking violation alert may be generated by the processor 202, as explained in FIG. 2. The generated parking violation alert may be communicated to the second vehicle 104, via the V2V communication channel 208*a*. The parking violation alert may be communicated to the second vehicle 104, based on the blinking of the one or more proximity indicators, such as the parking alert indicators, of the first vehicle 102*a*. In accordance with an embodiment, the processor 202 may be further configured to indicate the parking violation based on honking by use of the audio interface 206*b* of the I/O system 206 of the first vehicle 102*a*. In accordance with an embodiment, the processor 202 may be further configured to indicate the parking violation alert by use of the display device 206*a*.

At step 632, it may be determined whether a communication, via a communication channel, such as the V2V communication channel 208*a*, is possible with the owner of the second vehicle 104. In instances, when the V2V communication is possible, the control passes back to step 628. In instances, when the communication is not possible, the control passes to step 634. At step 634, the parking violation alert may be communicated to an owner of the first vehicle 102*a* and/or an authority managing the parking environment 100. Control passes to end step 640.

At step 636, when the second vehicle 104 corrects its direction of approach such that it is not detected within the predetermined distance, an acknowledgement message may be communicated to the second vehicle 104, via the V2V communication channel 208*a*, based on successful parking of the second vehicle 104. At step 638, the map that corresponds to the parking environment 100, may be updated, by the processor 202, based on the successful parking of the second vehicle 104. Control passes to end step 640.

Figure 7A:
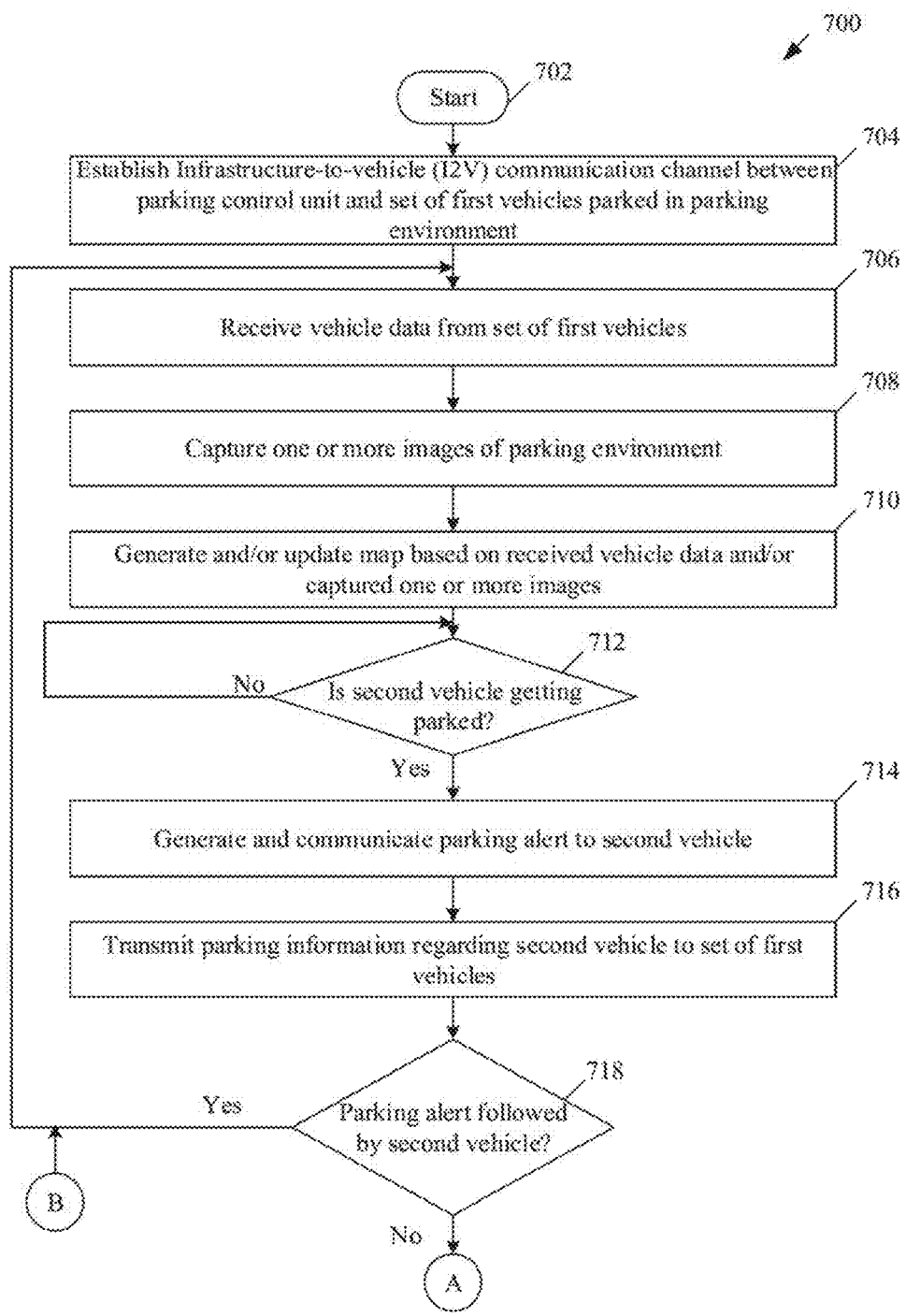
FIGS. 7A and 7B collectively depict a second flowchart that illustrates a second exemplary method implemented in a parking control unit, for generation of a parking alert, in accordance with an embodiment of the disclosure.
Figure 7B:
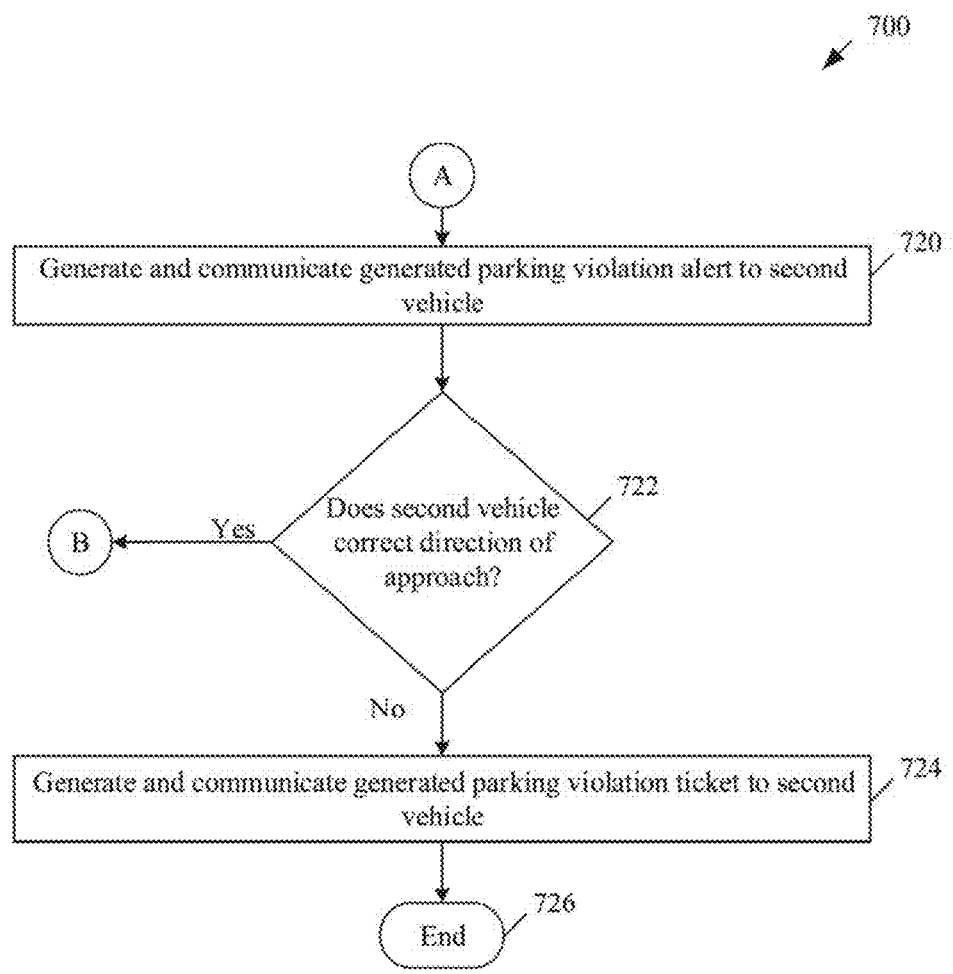

FIGS. 7A and 7B collectively depict a second flowchart that illustrates a second exemplary method implemented in a parking control unit for generation of a parking alert, in accordance with an embodiment of the disclosure. With reference to FIGS. 7A and 7B, there is shown a second flowchart 700. The second flowchart 700 is described in conjunction with FIG. 1 and FIG. 3. The method starts at step 702 and proceeds to step 704.

At step 704, an I2V communication channel may be established between the parking control unit 106 and the set of first vehicles 102 parked in the parking environment 100, monitored by the parking control unit 106. At step 706, vehicle data of the set of first vehicles 102, such as the set of first vehicles 102, may be received by the CPU 302 of the parking control unit 106. The vehicle data may include one or more of a DSRC identification, a latitude, a longitude, an elevation, a position accuracy, a transmission and a speed heading, a steering angle, an acceleration, a brake system status, a size, a direction, an identifier, and/or other optional messages.

At step 708, one or more images of the parking environment 100 may be captured by the imaging devices 306 and parking status information may be determined. At step 710, a map may be generated and/or updated based on the determined parking status information, received vehicle data and/or the captured one or more images. The generated map may be stored in the memory 304. At step 712, it may be determined whether one or more vehicles, such as the second vehicle 104, are in the process of parking at a parking space in the parking environment 100. Only in instances, when second vehicle 104 in the parking environment 100 is detected to be in the process of parking at the parking space, the control passes to step 714. In other instances, the control iterates the step 712.

At step 714, a parking alert may be generated and communicated to the second vehicle 104, based on the established I2V communication channel, via the transceiver 310. The parking alert may include at least a minimum safe distance for parking a vehicle adjacent to the set of first vehicles 102 and a location of the vacant parking space based on the size of the second vehicle 104.

At step 716, the parking information regarding the second vehicle 104 may be transmitted to one or more of the set of first vehicles 102, via the transceiver 310. At step 718, it may be determined whether the parking alert is followed by the second vehicle 104 based on the movement and/or the direction of motion of the second vehicle 104 towards the parking space adjacent to the first vehicle 102a. In instances when the parking alert is followed, the control passes back to step 706. In instances when the parking alert is not followed, the control passes to step 720.

At step 720, a parking violation alert may be generated. The generated parking violation alert may be communicated to the second vehicle 104, via the transceiver 310. At step 722, it may be determined whether the second vehicle 104 corrects its direction of approach towards the parking space. In instances when the second vehicle 104 corrects its direction of approach towards the parking space, the control passes back to step 706.

In instances when the second vehicle 104 does not correct its direction of approach, the control passes to step 724. At step 724, a parking violation ticket may be generated. The generated parking violation ticket may be communicated to the second vehicle 104. The generated parking violation ticket may be issued to the owner of the second vehicle 104, by the CPU 302. Further, in accordance with an embodiment, a parking violation alert received from the first vehicle 102a may be verified by the CPU 302. Based on the verification of the parking violation alert, a parking violation ticket may be issued to the owner of the second vehicle 104, by the CPU 302. The control passes to end step 726.

In accordance with an embodiment of the disclosure, the system to generate a parking alert may comprise one or more circuits in a first vehicle that may be controlled by the processor 202 of the electronic control unit (ECU) 110 used inside the first vehicle (as shown in FIG. 2). The processor 202 may be configured to detect a second vehicle within a predetermined distance with respect to the first vehicle. The processor 202 may be further configured to communicate a parking violation alert to the second vehicle and one or more users associated with the vehicle. The communication of the parking violation alert may be based on the detection of the second vehicle within the predetermined distance with respect to the first vehicle.

In accordance with an embodiment of the disclosure, the system to monitor a parking environment may comprise one or more circuits in the parking control unit 106, such as the central processing unit (CPU) 302 (as shown in FIG. 3). The CPU 302 may be configured to determine parking status information based on vehicle data received from the set of first vehicles 102, and/or one or more captured images of the parking environment. The CPU 302 may be further configured to generate a parking violation alert for the second vehicle 104 based on the determined parking status information. The CPU 302 may be further configured to communicate the generated parking violation alert to the second vehicle and one or more users associated with the second vehicle. The communicated parking violation alert may comprise an identifier of at least one of the set of first vehicles 102.

Various embodiments of the disclosure may provide a non-transitory, computer readable medium and/or storage medium stored thereon, a machine code and/or a computer program with at least one code section executable by a machine and/or a computer to generate a parking alert. The at least one code section may cause the machine and/or computer to perform the steps that comprise detection of a vehicle within a predetermined distance with respect to the first vehicle. A parking violation alert may be communicated to the second vehicle and one or more users associated with the vehicle. The communication of the parking violation alert may be based on the detection of the second vehicle within the predetermined distance with respect to the first vehicle.

Various embodiments of the disclosure may provide a non-transitory, computer readable medium and/or storage medium stored thereon, a machine code and/or a computer program with at least one code section executable by a machine and/or a computer to monitor a parking environment. The at least one code section may cause the machine and/or computer to perform the steps that comprise determination of parking status information, by a parking control unit, based on vehicle data received from the set of first vehicles 102 and/or one or more captured images of the parked environment. A parking violation alert may be generated for the second vehicle, by the parking control unit, based on the determined parking status information. The generated parking violation alert may be communicated, by the parking control unit, to the second vehicle and one or more users associated with the second vehicle. The communicated parking violation alert may comprise an identifier of at least one of the set of first vehicles 102.

In accordance with an embodiment of the disclosure, a vehicle, such as the first vehicle 102a, may be parked in the parking environment 100 and may include at least the battery unit 214, the display device 206a, and/or one or more circuits, such as the processor 202, controlled by an electronic control unit (ECU) 110, used in the first vehicle 102a. The processor 202 may be configured to detect another vehicle, such as the other first vehicles 102b to 102f and/or the second vehicle 104, within a predetermined distance with respect to the first vehicle 102a. The processor 202 may be further configured to communicate a parking violation alert to the detected another vehicle and one or more users associated with the other vehicle, via the V2V communication channel 208a of the wireless communication system 208. The processor 202 may be further configured to indicate, on the display device 206a, parking status information that may correspond to the detected another vehicle within the predetermined distance with respect to the first vehicle 102a. The display device 206a may be powered by the battery unit 214.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A parking control apparatus, comprising:
   a circuit configured to communicate vehicle information to a first vehicle located in a parking space, wherein the vehicle information comprises position information of the first vehicle;
   a sensor configured to generate sensing information of the first vehicle located in the parking space;
   a processor configured to:
     generate a map of a parking environment based on the sensing information and the vehicle information;
     update the map based on a change of parking status of a second vehicle in the parking space;
     generate a parking alert based on detection of approach of the second vehicle with respect to the first vehicle;
     communicate the parking alert to the second vehicle;
     generate a parking violation alert based on the detection of approach of the second vehicle that is within a threshold distance of the first vehicle; and
     communicate the parking violation alert to the second vehicle; and
   a memory configured to store the updated map.

2. The parking control apparatus according to claim 1, wherein the change of parking status is based on a movement of the second vehicle out of the parking space.

3. The parking control apparatus according to claim 1, wherein the change of parking status is based on a successful parking of the second vehicle.

4. The parking control apparatus according to claim 1, wherein the sensor is in the first vehicle.

5. The parking control apparatus according to claim 1, wherein the sensor is at the parking space.

6. A method, comprising:
   communicating vehicle information to a first vehicle located in a parking space, wherein the vehicle information comprises position information of the first vehicle;
   generating sensing information of the first vehicle located in the parking space;
   generating a map of a parking environment based on the sensing information and the vehicle information;
   updating the map based on a change of parking status of a second vehicle in the parking space;
   generating a parking alert based on detection of approach of the second vehicle with respect to the first vehicle;
   communicating the parking alert to the second vehicle;
   generating a parking violation alert based on the detection of approach of the second vehicle that is within a threshold distance of the first vehicle;
   communicating the parking violation alert to the second vehicle; and
   storing the updated map.

7. The method according to claim 6, wherein the change of parking status is based on a movement of the second vehicle out of the parking space.

8. The method according to claim 6, wherein the change of parking status is based on a successful parking of the second vehicle.

* * * * *